United States Patent
Taylor et al.

(10) Patent No.: US 11,704,883 B2
(45) Date of Patent: Jul. 18, 2023

(54) METHODS AND SYSTEMS FOR REPROJECTION IN AUGMENTED-REALITY DISPLAYS

(71) Applicant: Magic Leap, Inc., Plantation, FL (US)

(72) Inventors: Robert Blake Taylor, Sutdio City, CA (US); Gilles Cadet, Davie, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/859,840

(22) Filed: Jul. 7, 2022

(65) Prior Publication Data

US 2022/0343611 A1 Oct. 27, 2022

Related U.S. Application Data

(62) Division of application No. 17/083,216, filed on Oct. 28, 2020, now Pat. No. 11,417,065.

(60) Provisional application No. 62/927,617, filed on Oct. 29, 2019.

(51) Int. Cl.
*G06T 19/00* (2011.01)
*G06F 3/01* (2006.01)
*H04N 13/128* (2018.01)

(52) U.S. Cl.
CPC ............ *G06T 19/006* (2013.01); *G06F 3/012* (2013.01); *H04N 13/128* (2018.05)

(58) Field of Classification Search
CPC ........ G06T 19/006; G06F 3/012; G06F 3/011; H04N 13/128; H04N 13/268; H04N 13/344
See application file for complete search history.

(56) References Cited

U.S. PATENT DOCUMENTS

| | | |
|---|---|---|
| 8,872,854 B1 | 10/2014 | Levitt |
| 11,417,065 B2 | 8/2022 | Taylor et al. |
| 2011/0206124 A1 | 8/2011 | Morphet et al. |
| 2014/0139524 A1 | 5/2014 | Nilsson et al. |
| 2017/0084074 A1 | 3/2017 | Hwang et al. |
| 2018/0047332 A1 | 2/2018 | Kuwahara et al. |

(Continued)

OTHER PUBLICATIONS

U.S. Appl. No. 17/083,216 , "Non-Final Office Action", dated Nov. 26, 2021, 13 pages.

(Continued)

*Primary Examiner* — Chong Wu
(74) *Attorney, Agent, or Firm* — Kilpatrick Townsend & Stockton LLP

(57) ABSTRACT

Methods and systems are provided for a reprojection engine for augmented-reality devices. The augmented-reality device projects virtual content within a real-world environment. The augmented-reality device tracks a six degrees of freedom headpose of the augmented-reality device, depth information of the virtual content, motion vectors that correspond to movement of the virtual content, and a color buffer for a reprojection engine. The reprojection engine generates a reprojection of the virtual content defined by an extrapolation of a first frame using the headpose, the depth information, motion vectors, and the color surface data structure. The reprojected virtual content continues to appear as if positioned with the real-world environment regardless of changes in the headpose of the augmented-reality device or motion of the virtual content.

11 Claims, 12 Drawing Sheets

(56) References Cited

U.S. PATENT DOCUMENTS

2021/0142575 A1    5/2021  Taylor et al.
2021/0241427 A1*   8/2021  McCombe ............. H04N 5/247
2022/0188997 A1*   6/2022  Moriuchi ................. G06T 5/50

OTHER PUBLICATIONS

U.S. Appl. No. 17/083,216 , "Notice of Allowance", dated Apr. 8, 2022, 8 pages.

* cited by examiner

METHODS AND SYSTEMS FOR REPROJECTION IN AUGMENTED-REALITY DISPLAYS

CROSS-REFERENCES TO RELATED APPLICATIONS

This application is a divisional of U.S. patent application Ser. No. 17/083,216, filed on Oct. 28, 2020, U.S. Pat. No. 11,417,065, issued on Aug. 16, 2022, entitled "METHODS AND SYSTEMS FOR REPRODUCTION IN AUGMENTED-REALITY DISPLAYS," which is a non-provisional of and claims the benefit of and priority to U.S. Provisional Patent Application No. 62/927,617, filed on Oct. 29, 2019, entitled "METHODS AND SYSTEMS FOR REPRODUCTION IN AUGMENTED-REALITY DISPLAYS," the entire contents of which are hereby incorporated by reference for all purposes.

BACKGROUND OF THE INVENTION

Modern computing and display technologies have facilitated the development of systems for "virtual reality" or "augmented reality" experiences, wherein digitally reproduced images or portions thereof are presented to a viewer in a manner wherein they seem to be, or may be perceived as real. A virtual reality, or "VR" scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods, systems, and devices related to augmented reality systems, particularly, display systems.

SUMMARY OF THE INVENTION

Aspects of the present disclosure include methods for generating an augmented depth buffer for an augmented-reality device having a pixel resolution. The method includes receiving, for each of a first set of pixels, a depth value from an application executing on the augmented-reality device; storing, in a depth buffer, the depth value of each pixel of the first set of pixels; deriving, for a second set of pixels, a depth value using a stereo disparity between two versions of a same frame; storing, in a temporary depth buffer, the depth value of each pixel of the second set of pixels; initializing an augmented depth buffer that is configured to store a depth value for each pixel of the augmented-reality device; and storing, in the augmented depth buffer, an augmented depth value for each pixel of the first set of pixels and the second set of pixels. The augmented depth value for each pixel is determined by: selecting the depth value in the depth buffer to be the augmented depth value based on determining that there is a value for the pixel in the depth buffer; selecting the depth value in the temporary depth buffer to be the augmented depth value based on determining that there is a value for the pixel in the temporary depth buffer but not in the depth buffer; and selecting, as the augmented depth value, the depth value that is smallest between the depth buffer and the temporary depth buffer based on determining that there is a value for the pixel in the temporary depth buffer and in the depth buffer.

Another aspect of the present disclosure includes methods for warping a virtual object for an augmented-reality application. The methods include determining a three-dimensional coordinate of each pixel of a set of pixels in a color buffer at a first time, the three-dimensional coordinate representing a location of the pixel within an environment; determining an updated three-dimensional coordinate for each pixel of the set of pixels using a set of motion vectors, the set of motion vectors corresponding to a motion of the set of pixels at the first time; projecting the set of pixels onto an augmented-reality device, wherein projecting includes mapping the updated three-dimensional coordinate of each pixel to a two-dimensional coordinate of the augmented-reality device; appending, for each pixel of the set of pixels, the pixel to a linked list associated with the two-dimensional coordinate of the pixel, wherein the linked list includes a reference to one or more pixels, each pixel of the one or more pixels being associated with the two-dimensional coordinate; for each two-dimensional coordinate: sorting the linked list based on a depth value of each pixel referenced by the linked list, wherein the depth value represents a distance between an augmented-display device and the updated three-dimensional coordinate of the pixel; determining a closest pixel of the pixels of the linked list that is associated with the smallest depth value; and selecting a color value of the pixel to be displayed at the two-dimensional coordinate that is equal to a color value of the closest; and applying, for each two-dimensional coordinate, a convolution filter to the set of pixels.

Another aspect of the present disclosure includes methods for warping a virtual object for an augmented-reality application. The method includes determining a three-dimensional coordinate of each pixel of a set of pixels in a color buffer at a first time, the three-dimensional coordinate representing a location of the pixel within an environment; determining an updated three-dimensional coordinate for each pixel of the set of pixels using one or more motion vectors, the one or more motion vectors corresponding to a motion of the set of pixels at the first time; projecting the set of pixels onto an augmented-reality device, wherein projecting includes mapping the updated three-dimensional coordinate of each pixel to a two-dimensional coordinate of the augmented-reality device; determining, for each two-dimensional coordinate, a subset of the set of pixels in which each pixel of the subset of the set of pixels is associated with the two-dimensional coordinate; identifying, for each two-dimensional coordinate, a closest pixel from the subset of the set of pixels, the closest pixel having a smaller depth value than the other pixels of the subset of the set of pixels; encoding, in a data structure associated with each two-dimensional coordinate of the augmented-reality device, a depth value for each pixel associated with a two-dimensional coordinate, wherein the closest pixel is stored in a particular set of bits of the data structure; and applying, for each two-dimensional coordinate, a convolution filter to the set of pixels.

The data structure may store the pixel, a reference to a pixel (e.g., a pointer), an identification of the pixel (e.g., an identifier such as a hash), characteristics of the pixel (e.g., color data and/or depth data), combinations thereof, or the like. In some instances, each pixel may be encoded within particular bits of the data structure. For instance, the data structure may include N bits. The pixel with the smallest depth value with respect to other pixels of the data structure may be stored in the upper N/2 bits of the data structure. Encoding the pixel with the smallest depth within a particular memory location of the data structure enables the AR device to identify the correct pixel from the three-dimensional coordinate space to display within the two-dimensional display of the AR device without another pass through the coordinate space. In other words, encoding the closest pixel (with the smallest depth value) reduces the number of passes that may be performed. Thus, the data structure can include N bits and the particular set of bits of the data structure can include an upper N/2 bits of the data structure.

Another aspect of the present disclosure includes methods related to projection in an augmented-reality device. The method includes receiving a first headpose at a first time, the first time coinciding with rendering of a first frame; determining a second headpose using one or more sensors of the augmented-reality device, the second headpose corresponding to a second time coinciding with a second frame to be rendered, the second frame to include virtual content that is projected onto a real-world environment; defining a headpose difference using the first headpose and the second headpose; determining depth information for the virtual content; receiving, from an augmented-reality application executing on the augmented-reality device, one or more motion vectors associated with the virtual content; receiving a color surface data structure that represents color values of the virtual content; and generating a reprojected color surface for the virtual content that includes an updated color surface data structure defined by an extrapolation of the first frame using the headpose difference, the depth information, the one or more motion vectors, and the color surface data structure.

Another aspect of the present disclosure includes a system comprising one or more processors and a non-transitory computer-readable media that includes instructions that, when executed by the one or more processors, cause the one or more processors to perform methods described herein.

Another aspect of the present disclosure includes a non-transitory computer-readable media that includes instructions that, when executed by one or more processors, cause the one or more processors to perform the methods described herein. In some embodiments, reprojection may be implemented using a system on a chip (SOC) that includes process resources (e.g., processor, memory, etc.). Thus, SOC implementations for the system and non-transitory computer-readable media described herein are included within the scope of the present invention.

Another aspect of the present disclosure includes a system that includes an augmented depth buffer; a color surface database; a motion surface database; a headpose difference database; and a reprojection engine coupled to the augmented depth buffer, the color surface database, the motion surface database, and the headpose difference database. The reprojection engine can be operable to utilize the motion surface database to project pixels onto an updated three-dimensional position of a subsequent frame. The reprojection engine can be operable to utilize the augmented depth buffer and the color surface database to compute a three dimensional position of a pixel. The reprojection engine can be operable to utilize the headpose difference database to determine a camera position and orientation between a frame and a subsequent frame.

The motion surface database can store motion vectors, which can be two-dimensional motion vectors or three-dimensional motion vectors. The headpose difference database can store a difference between two, six degrees of freedom (DoF) headposes or a difference between two, three degrees of freedom (DoF) headposes.

According to another embodiment of the present disclosure, a method for generating an augmented depth buffer for an augmented-reality device having a number of pixels and a pixel resolution is provided. The method includes deriving, for one or more of the number of pixels, a depth value using stereo disparity between two versions of a same frame and storing, in an augmented depth buffer, the depth value of each of the one or more of the number of pixels. The method also includes receiving, from an application executing on the augmented-reality device, an updated depth value for at least some of the number of pixels. For each of the at least some of the number of pixels, the method includes (a) determining whether the updated depth value is smaller than the depth value, (b) replacing, in response to determining that the updated depth value is smaller than the depth value, the depth value with the updated depth value, and repeating (a) through (b) for remaining pixels of the at least some of the number of pixels.

The one or more of the number of pixels can equal the number of pixels. The at least some of the number of pixels can equal the number of pixels. The method can also include initializing the augmented depth buffer by storing an INF value associated with each of the number of pixels. The INF value may be any number that is larger than a maximum depth value for the AR device, thereby representing "infinity."

According to another embodiment of the present disclosure, a method for generating an augmented depth buffer for an augmented-reality device having a number of pixels is provided. The method includes accessing, for each of a first set of pixels, a first depth value from an application of the augmented-reality device and deriving, for each of a second set of pixels, a second depth value using stereo disparity between two versions of a same frame. The method also includes generating the augmented depth buffer by performing, for each of the number of pixels, a MIN operation using the first depth value and the second depth value.

Generating the augmented depth buffer can include storing, in augmented depth buffer, the first depth value of each pixel of the first set of pixels and updating the augmented depth buffer, for each of the number of pixels, by storing the second depth value if the second depth value is less than the first depth value.

According to a particular embodiment of the present disclosure, a method for warping a virtual object for an augmented-reality application is provided. The method includes determining a three-dimensional coordinate of each pixel of a set of pixels at a first time, the three-dimensional coordinate representing a location of the each pixel within an environment and determining an updated three-dimensional coordinate for each pixel of the set of pixels using a set of motion vectors, the set of motion vectors corresponding to a motion of the set of pixels during a first time. The method also includes projecting the set of pixels onto an augmented-reality device. Projecting includes mapping the updated three-dimensional coordinate of each pixel to a two-dimensional coordinate of the augmented-reality device. The method further includes appending, for each pixel of the set of pixels, the pixel to a linked list associated with the two-dimensional coordinate of the pixel. The linked list includes a reference to one or more pixels, each pixel of the one or more pixels being associated with the two-dimensional coordinate. For each two-dimensional coordinate, the method includes sorting the linked list based on a depth value of each pixel referenced by the linked list. The depth value represents a distance between an augmented-display device and the updated three-dimensional coordinate of the pixel. For each two-dimensional coordinate, the method also includes determining a closest pixel of the pixels of the linked list that is associated with the smallest depth value, and selecting a color value of the pixel to be displayed at the two-dimensional coordinate that is equal to a color value of the closest pixel. The method further includes applying, for each two-dimensional coordinate, a convolution filter to the set of pixels.

Determining the three-dimensional coordinate of each pixel can include receiving a color buffer and an augmented depth buffer. The set of motion vectors can include two-dimensional motion vectors or three-dimensional motion vectors. Determining the updated three-dimensional coordinate for each pixel of the set of pixels using one or more motion vectors can include multiplying a set of motion vectors by a time interval between a first frame and a second frame.

According to another particular embodiment of the present disclosure, a method for warping a virtual object for an augmented-reality application is provided. The method includes determining a three-dimensional coordinate of each pixel of a set of pixels at a first time, the three-dimensional coordinate representing a location of the pixel within an environment; determining an updated three-dimensional coordinate for each pixel of the set of pixels using one or more motion vectors, the one or more motion vectors corresponding to a motion of the set of pixels during a first time interval; and projecting the set of pixels onto an augmented-reality device by mapping the updated three-dimensional coordinate of each pixel to a two-dimensional coordinate of the augmented-reality device. The method also includes determining, for each two-dimensional coordinate, a subset of the set of pixels in which each pixel of the subset of the set of pixels is associated with the two-dimensional coordinate; identifying, for each two-dimensional coordinate, a closest pixel from the subset of the set of pixels, the closest pixel having a smaller depth value than the other pixels of the subset of the set of pixels; encoding, in a data structure associated with each two-dimensional coordinate of the augmented-reality device, a depth value for each pixel associated with the two-dimensional coordinate, wherein the closest pixel is stored in a particular set of bits of the data structure; and applying, for each two-dimensional coordinate, a convolution filter to the set of pixels.

Determining the three-dimensional coordinate of each pixel can include receiving a color buffer defining a color for each pixel of the set of pixels and an augmented depth buffer defining the depth value for each pixel of the set of pixels. The motion vectors can include two-dimensional motion vectors or three-dimensional motion vectors. Determining the updated three-dimensional coordinate for each pixel of the set of pixels using one or more motion vectors can include multiplying a set of motion vectors by the first time interval.

According to a specific embodiment of the present disclosure, a system is provided. The system includes a headpose difference database, a stabilization depth value, a motion surface database, a color surface database, and a reprojection engine coupled to the headpose difference database, the stabilization depth value, the motion surface database, and the color surface database. The headpose difference databases can store a difference between two, six degrees of freedom (DoF) headposes. The reprojection engine can be operable to utilize the motion surface database to project pixels onto an updated three-dimensional position of a subsequent frame. The reprojection engine can also be operable to utilize the stabilization depth value and the color surface database to compute a three dimensional position of a pixel. Moreover, the reprojection engine can be operable to utilize the headpose difference database to determine a camera position and orientation between a frame and a subsequent frame. The motion surface database can store two-dimensional motion vectors or three-dimensional motion vectors.

Numerous benefits are achieved by way of the present disclosure over conventional techniques. For example, embodiments of the present disclosure provide an improved reprojection engine that uses per pixel depth information, changes in the headpose of the AR device, three-dimensional motion vectors, and surface color data to reproject virtual content with reduced reprojection errors and with improved accuracy between frames. In addition, the AR device may modulate the execution of the reprojection engine so as to modulate resource consumption on-demand at runtime. These and other embodiments of the invention along with many of its advantages and features are described in more detail in conjunction with the text below and attached figures.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION OF SPECIFIC EMBODIMENTS

Figure 1:
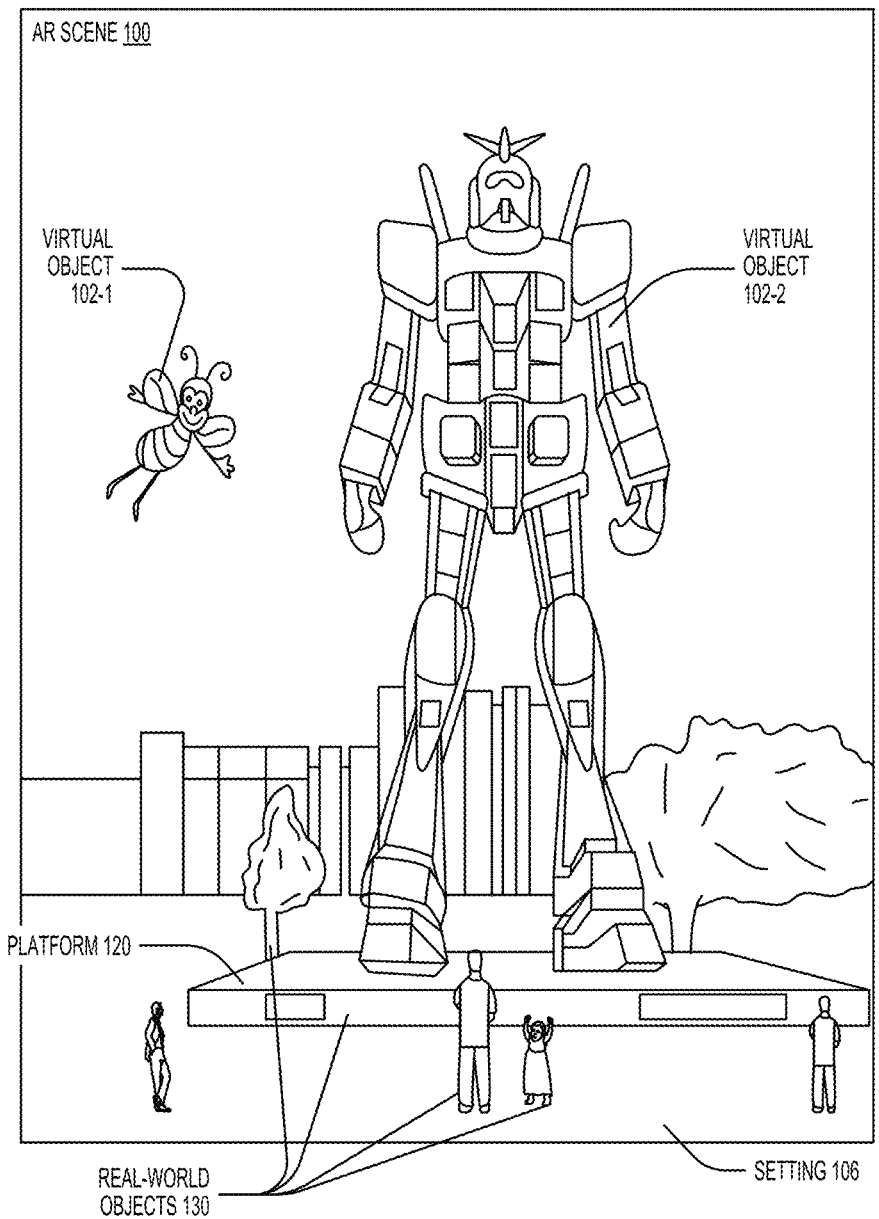
FIG. 1 illustrates an AR presentation as viewed through an AR display device, according to at least one aspect of the disclosure.

The present disclosure relates generally to methods and systems for "virtual reality" or "augmented reality" displays with dynamic field of view. More particularly, embodiments of the present disclosure provide methods and systems that relate to projecting and reprojecting virtual content onto a display of an augmented-reality device. Augmented-reality (AR) devices project virtual content onto display devices that also display portions of the real-world environment around the display. For instance, the display device may be partially transparent allowing the user to view both the real-world environment as well as the virtual object. The virtual content may be projected onto the display such that the virtual content appears as if positioned within the real-world environment. A reprojection engine can track the headpose of the AR device, the movement of virtual content using three-dimensional motion vectors, and the depth of the environment (per pixel) to reproject an accurate projection of the virtual content.

Embodiments of the present disclosure are applicable to a variety of applications in computer vision and three-dimensional (3D) reconstruction.

AR devices represent virtual content within a coordinate system of the real-world environment (e.g., in three dimensions). An application executing to project virtual content includes a buffer that stores depth information of the virtual content. The projection of the virtual content includes mapping the three-dimensional coordinates of the virtual content to the two-dimensional image plane of the display. The AR device can use the depth information in the three-dimensional coordinate space to more accurately project virtual content as if within the real-world environment.

The AR device may track a headpose (e.g., position and orientation of the VR device) and motion of the user wearing (or using) the AR device to maintain coherence between the virtual content and the real-world environment. For instance, at each interval (e.g., the time between successively rendered frames), the AR device determines how to reproject the virtual content on the display of the AR display device given that the headpose has changed and/or the user has moved. In some instance, reprojection errors can occur when reprojecting the virtual content when only accounting for the change in pose and the motion of the user. For instance, the AR display device may not accurately reproject a first virtual object if the user's motion is such that a portion of the first virtual object is occluded by the real-world environment or by another virtual object. Further errors may arise when the virtual content moves relative to the movement of the user.

Aspects of the present disclosure manage reprojection errors using a reprojection engine that determines how to reproject virtual content based on changes between successive frames. The reprojection engine may be a three degrees-of-freedom (DoF) reprojection engine or a six DoF reprojection engine. The reprojection engine accurately reprojects the virtual content within a frame from an extrapolation of a previously rendered frame using a detected change in the headpose, depth information, motion vectors, and a color surface data structure.

The AR device may track the headpose of the user within the coordinate system of the real-world environment in three DoF (e.g., rotational motion such as pitch, yaw, and roll) or in six DoF (e.g., rotational motion and translational movement such as surge, heave, and sway). Sensors within the AR device may track the movement of the user to detect changes in the headpose. For instance, a headpose difference may be defined as the difference in the headpose between a first time (e.g., when a first frame is displayed) and a second time (e.g., when a next frame is rendered), with the time between the first time and the second time defining a time interval. The change in headpose may be used by the reprojection engine to maintain the coherence of the virtual content as the user moves within the real-world environment.

The reprojection engine uses depth information to define a focal point of the rendered virtual content. For instance, the AR device may be a wearable device where the virtual content is rendered on a display that may be close to the user's eyes. The virtual content may be rendered such that although the user is viewing the image in close proximity, the virtual content appears as if positioned within the real-world environment. The depth information may also be used to manage occlusion of the virtual content (e.g., where the real-world environment or another virtual object is in front and thus blocking part of a virtual object). For instance, when two virtual objects overlap, the reprojection engine determines, from depth information, which pixels of which virtual objects are to be rendered.

The reprojection engine may receive motion information of the virtual content from the application that defined the virtual content. The motion information may include a two-dimensional (2D) motion vector or a three-dimensional (3D) motion vector for each virtual object or component thereof (e.g., pixel, surface, etc.). The reprojection engine uses the motion vectors to extrapolate a new position of a virtual object from the previous frame (e.g., last known position of the virtual object). In some instances, 2D motion vectors may be used to reduce the processing burden of the AR device (e.g., to reduce processing cycles, power consumption, etc.). 3D motion vectors may be used in other instances to increase the accuracy of the reprojection.

The reprojection engine uses the color surface information of the virtual object to maintain color coherence of the virtual object within the real-world environment. For instance, the color surface information may be used to ensure that the color of the virtual object is accurately reprojected when the virtual object is rendered within subsequent frames.

The reprojection engine reprojects the virtual content onto the 2D display of the AR device at predetermined time intervals (e.g., at a predetermined refresh rate). The reprojection engine reprojects the color surface of each layer of the virtual content using (for each corresponding layer) the headpose difference, depth information, motion vectors, and color surface. The resulting reprojection accurately captures the virtual content within the real-world environment.

FIG. 1 illustrates an AR presentation 100 as viewed through a wearable AR device, according to at least one aspect of the disclosure. AR presentation 100 is depicted wherein a user of an AR technology sees a real-world park-like setting 106 featuring various real-world objects 130 such as people, trees, buildings in the background, and a real-world concrete platform 120. In addition to these items, the user of the AR device can also perceive various virtual objects 102 such as a robot statue 102-2 standing upon the real-world concrete platform 120, and a cartoon-like avatar character 102-1 flying by, even though these elements (character 102-1 and statue 102-2) do not exist in the real world. The various depths of surfaces (both real and virtual) and relative motions may be tracked to maintain the coherent appearance of the character 102-1 and statue 102-2 within the real-world environment.

Figure 2:
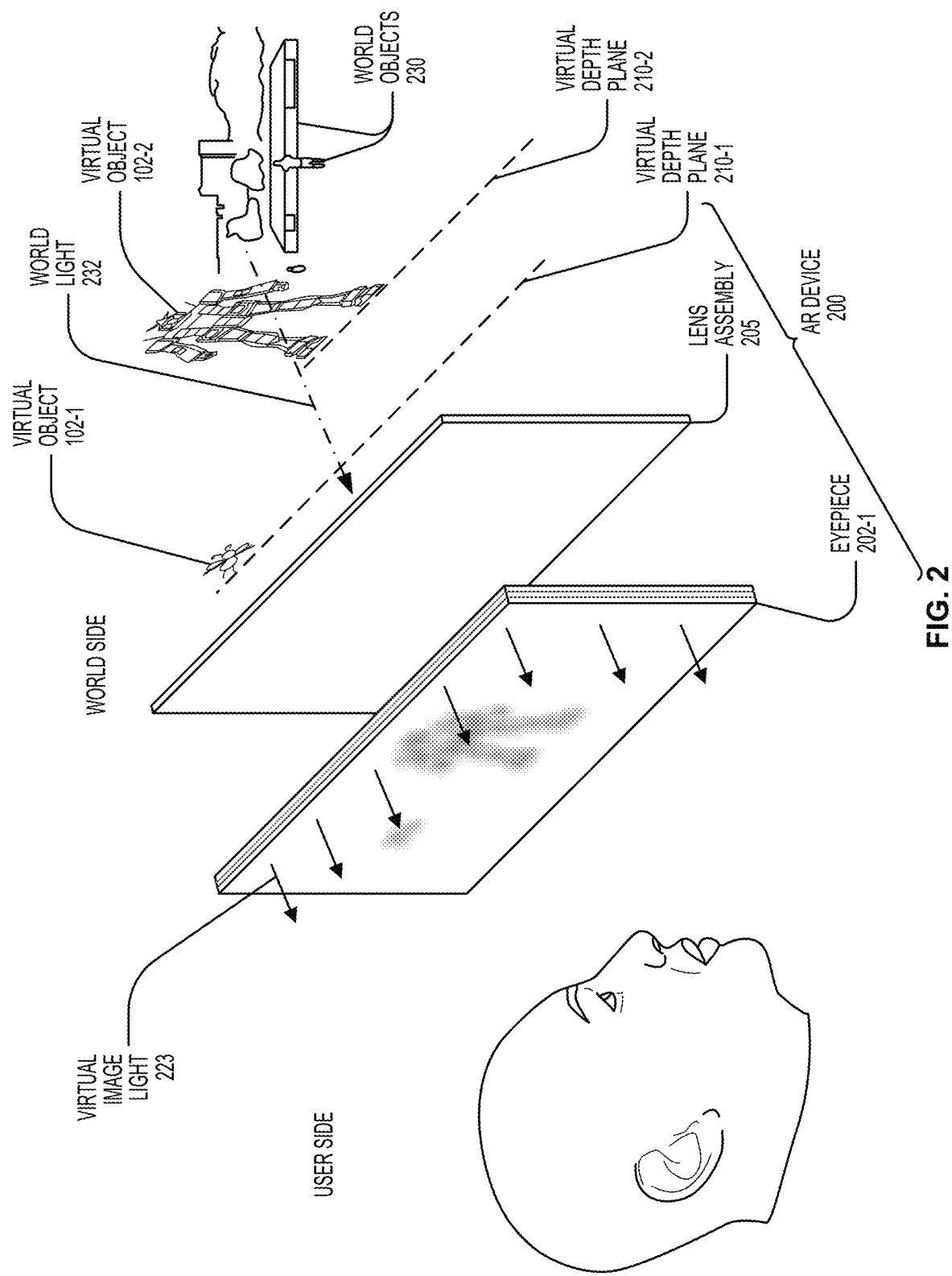
FIG. 2 illustrates a portion of an AR display device relative to the AR presentation, according to at least one aspect of the disclosure.

FIG. 2 illustrates an AR device 200 having a focal plane for displaying virtual content within a real-world environment, according to at least one aspect of the disclosure. During operation, a projector of AR device 200 may project virtual image light 223 (i.e., light associated with virtual content) onto an eyepiece 202-1, which may cause a light field (i.e., an angular representation of virtual content) to be projected onto a retina of a user in a manner such that the user perceives the corresponding virtual content as being positioned at a location within the real-world environment of the user. For example, virtual image light 223 outcoupled by eyepiece 202-1 may cause the user to perceive character 102-1 as being positioned at a first virtual depth plane 210-1 and statue 102-2 as being positioned at a second virtual depth plane 210-2. The user perceives the virtual content along with world light 232 corresponding to one or more world objects 230, such as platform 120.

In some instances, AR device 200 includes a lens assembly 205 configured to apply optical power to the light passing therethrough. The lens assembly (as depicted) may be positioned on the world side of eyepiece 202-1. In some instances, the lens assembly may be positioned on the user side of eyepiece 202-1 (the side of eyepiece 202-1 closest to the eye of the user). In still yet other instances, AR device 200A may include multiple lens assemblies such that, for example, a first lens assembly may be positioned on the user side of eyepiece 202-1 and a second lens assembly may be positioned on the world side of eyepiece 202-1.

In some instances, a user of AR device 200 may view a single eyepiece 202-1 such that the user views a single presentation of the virtual image light with both eyes. In other instances, the AR device 200 may include two eyepieces in which the user views a first presentation of the virtual light with a first eye and a second presentation of the virtual light with a second eye. In those instances, the eyepieces may project different versions of the virtual image light so as to provide stereo disparity (e.g., depth perception) to the user. For instance, virtual image light 223 outcoupled by first eyepiece 202-1 may cause the user to perceive character 102-1 as being positioned at a first virtual depth plane 210-1 and virtual image light 223 outcoupled by a second eyepiece may cause the user to perceive statue 102-2 as being positioned at a second virtual depth plane 210-2.

Figure 3:
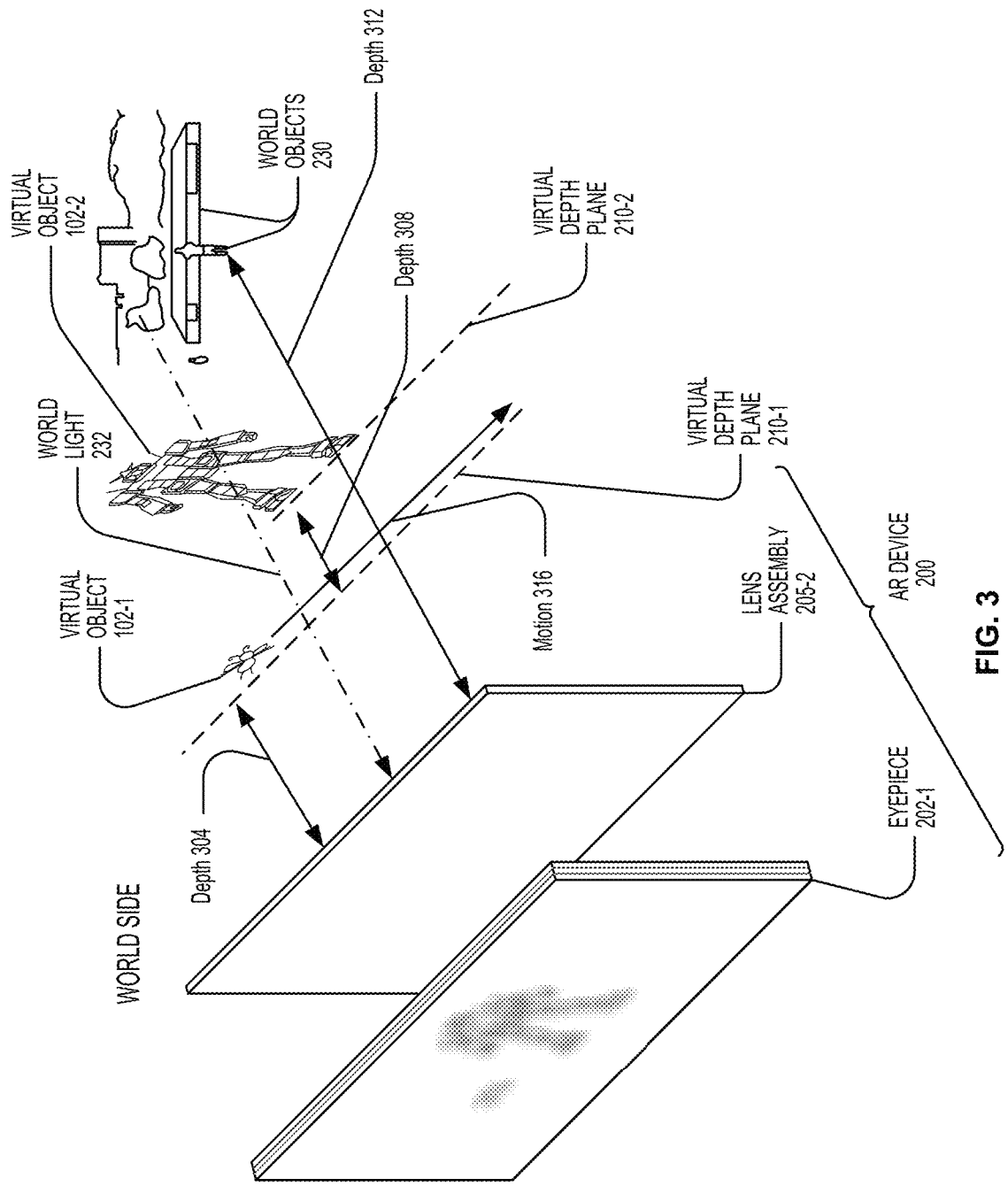
FIG. 3 illustrates a portion of an AR display device relative to the AR presentation, according to at least one aspect of the disclosure.

FIG. 3 illustrates an AR device 200 having a focal plane for displaying virtual content within a real-world environment, according to at least one aspect of the disclosure. The AR device may track the depth 304 of virtual object 102-1, the depth 308 of character 102-2, and the depth 312 of surfaces in the real-world environment (e.g., world objects 230). The AR device 200 may also track the motion of the virtual content (e.g., motion 316 of virtual object 102-1) to provide accurate reprojection of the virtual content within the environment. For instance, since eyepiece 202-1 is a two-dimensional projection of a three-dimensional space, a motion of the virtual object 102-1 may cause virtual object 102-1 to overlap with virtual object 102-2. By tracking the motion 316, AR device 200 can detect that (with respect to the two-dimensional projection of eyepiece 202-1) virtual object 102-1 will overlap with virtual object 102-2 in a subsequent frame. By tracking the depths 304, 308, and 312 of virtual object 102-1, virtual object 102-2, and world objects 230, respectively, AR device 200 can reproject virtual object 102-1 such that the virtual object 102-1 occludes a portion of virtual object 102-2 (to provide the perception that virtual object 102-1 is in front of virtual object 102-2).

The AR device 200 may define depth by generating a three-dimensional coordinate system in the real-world environment and assigning three-dimensional coordinates to each of the virtual objects and the real-world objects. A depth buffer may be used to store depth values of the virtual content.

An application executed by AR device 200 may provide the depth information for the virtual content (e.g., the same application that defines the virtual objects). The VR device 200 may include one or more sensors, such as a time of flight (ToF) sensor, which may be used to obtain depth values for the world objects 230. In some instances, a stereo disparity between a first version of a frame (presented via a first eyepiece) and a second version the frame (presented via the second eyepiece) may be used to provide depth information. In other instances, the depth buffer may be augmented using the stereo disparity depth information.

Figure 4:
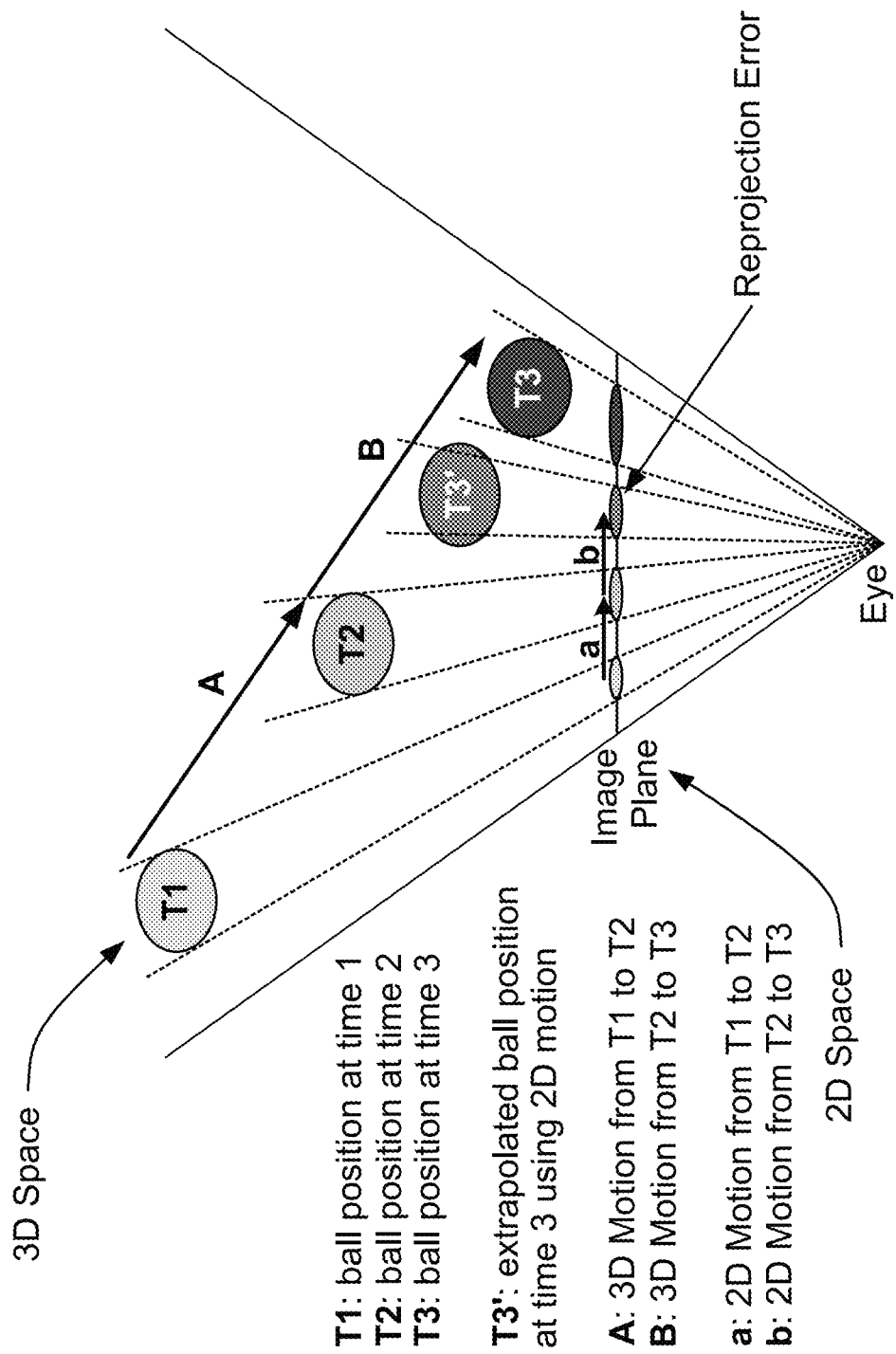
FIG. 4 illustrates a diagram of linear extrapolation of two-dimensional motion vectors according to at least one aspect of the disclosure.

FIG. 4 illustrates a diagram of linear extrapolation of two-dimensional motion vectors, according to some embodiments. The AR device may track motion of the virtual objects relative to a motion (or change in headpose) of the user to provide accurate reprojection of the virtual objects. The motion of each pixel that makes up the virtual content can be tracked by a motion vector. In some embodiments, the motion may be tracked using two-dimensional motion vectors. For instance, the application executed by the AR device to render a virtual object may output a motion vector as a two-dimensional motion vector. A two-dimensional motion vector can include the magnitude, and the direction of the motion (e.g., in two-dimensions). In some instances, the two-dimensional motion vector may also include starting coordinates (e.g., x and y coordinates) of the pixel.

For instance, the AR device may represent a virtual object such as a ball in a three-dimensional space, but project the ball onto a two-dimensional image plane. The virtual object may have a motion that brings the virtual object closer to the user from a left side of view to a right side of view. As illustrated in FIG. 4, T1 is the ball position at time 1, T2 is the ball position at time 2, T3 is the ball position at time 3, and T3' is the extrapolated ball position at time 3 using 2D motion vectors. A represents the 3D motion vector from T1 to T2, B represents the 3D motion vector from T2 to T3, a represents the 2D motion vector from T1 to T2, and b represents the 2D motion vector from T2 to T3.

In order to accurately project the image onto a two-dimensional image plane, the image may become larger (to infer a smaller depth) in addition to being projected at a different two-dimensional coordinate position. The position (e.g., initial/starting position) and orientation of the virtual object may be determined using the position of the virtual object at a first time (e.g., time T1 of an initial frame) and the two-dimensional motion vector. The AR device may then linearly extrapolate from the position and two-dimensional motion vector (e.g., 'a') the location of the virtual object at time T2 (e.g., the time interval between the initial/first frame and a second frame). Extrapolation may include multiplying the motion vector by the time interval between T1 and T2 to determine the change in the position. A new two-dimensional motion vector (e.g., 'b') may be used along with the position of the virtual object at T2 to extrapolate the position of the virtual object at T3'.

In some embodiments, a reprojection error can occur when representing virtual objects in three-dimensional space and projecting the virtual objects onto the two-dimensional image space using two-dimensional motion vectors. The AR device provides a three-dimensional coordinate space to identify how the virtual objects are to be presented relative to the real-world objects. For instance, if the virtual objects were tracked using two-dimensional coordinates, it may not be possible to accurately present a virtual object having a particular depth relative to (e.g., being closer to or further from) a real-world object. Returning to the example above, the motion of the virtual object in the three dimensional space (e.g., 'A' and 'B') is not equal to the two-dimensional motion vectors (e.g., 'a' and 'b' respectively). As a result, if two-dimensional motion vectors are used, the resulting three dimensional coordinates of the virtual object after motion vector 'b' may be incorrectly defined as T3'. Yet, the actual motion in three dimensional space (e.g., 'A' and 'B') would place the virtual object at T3.

Despite the potential for introducing reprojection error, two-dimensional motion vectors may be used by a reprojection engine due to the low computational overhead. Two-dimensional motion vectors simplify the reprojection of virtual content, which reduces the processing burden of the reprojection. A projection engine (e.g., such as the reprojection engine described below) may balance the potential for error with resource consumption requirements by using two-dimensional motion vectors to reduce resource consumption, for example, during high load situations or power-saving situations. For example, when processing resources are available, the AR device may switch to synthetic three-dimensional motion vectors (described in connection with FIG. 5 below) or true three-dimensional motion vectors.

As described herein, the inventors have determined that linear extrapolation of the 2D motion is different than the linear extrapolation of 3D motion. As a result, as shown in FIG. 4, a=b is not equivalent to A=B.

Figure 5:
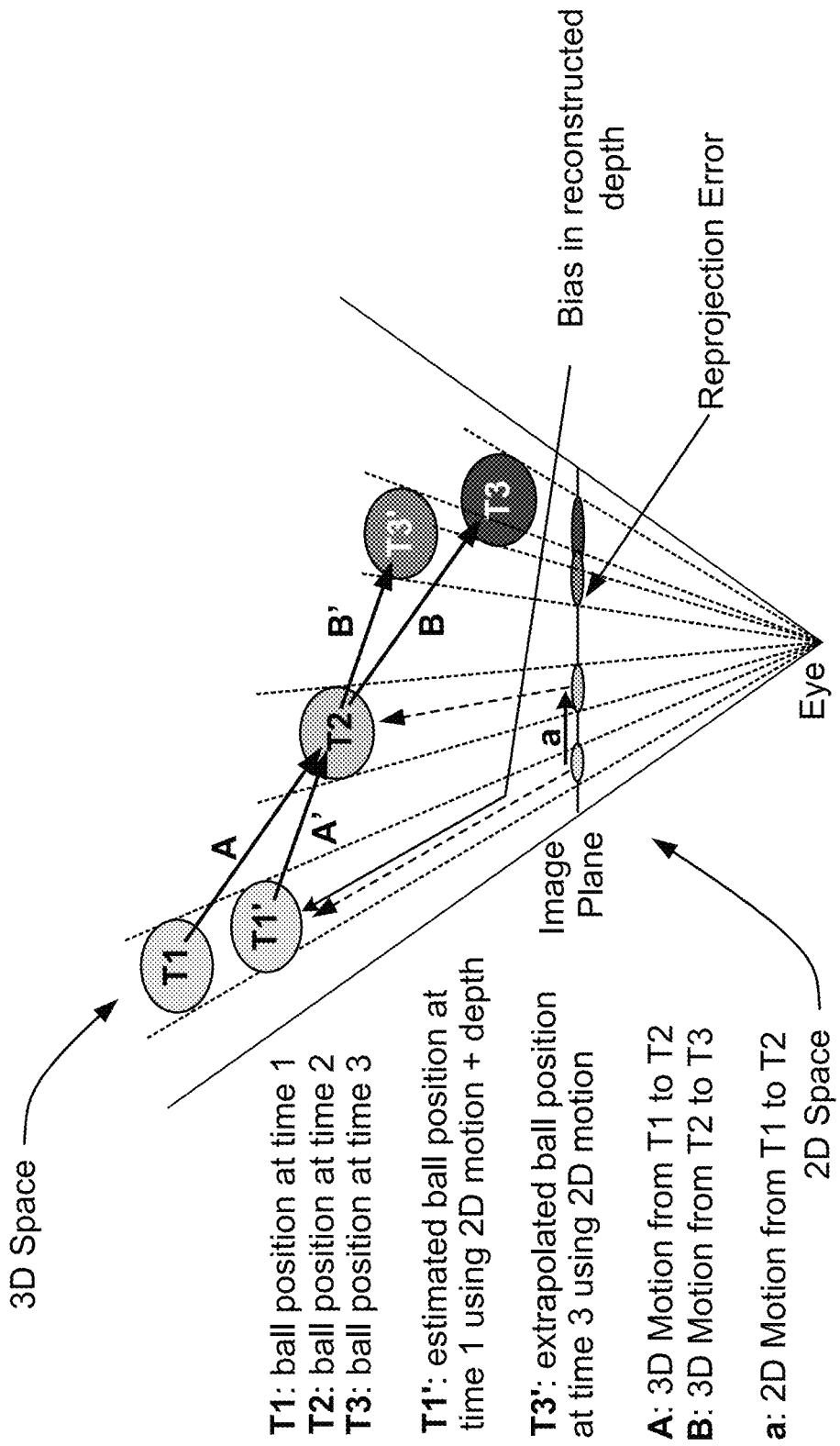
FIG. 5 illustrates a diagram of linear extrapolation of synthetic three-dimensional motion vectors according to at least one aspect of the disclosure.

FIG. 5 illustrates a diagram of linear extrapolation of synthetic three-dimensional motion vectors, according to some embodiments. In some instances, the AR device may reduce the likelihood of reprojection errors (caused by two-dimensional motion vectors) by using synthetic three-dimensional motion vectors derived from a two-dimensional motion vector and depth information. A three-dimensional motion vector can include the magnitude of the motion, and the direction of the motion in three-dimensions. In some instances, the two-dimensional motion vector may also include the starting coordinates (e.g., x, y, and z coordinates) of the pixel. In some instances, the AR device may use a depth value for the pixel from a depth buffer.

Synthetic three-dimensional motion vectors can reduce the reprojection errors identified above in connection to using two-dimensional motion vectors. In some embodiments, synthetic three-dimensional motion vectors may cause the AR device to introduce a bias in the three-dimensional coordinates of the virtual object. For instance, the AR device may provide an estimation of the location of the virtual object (e.g., T1' at time 1) despite the three-dimensional coordinates of the virtual object being positioned at T1. As depicted, the two-dimensional projection of the virtual object may not be affected. The bias introduces a propagating variance between motion vectors A (being three-dimensional motion) and A' (being the synthetic three-dimensional motion vector generated from two-dimensional motion vector 'a'). For instance, the AR device may use T1' and T2 to extrapolate a subsequent position of the virtual object at the subsequent time interval. Since the starting point estimated using two-dimensional motion vectors and depth is biased at T1', the linear extrapolation of the motion of the virtual object B' results in a reprojection error in which the extrapolated position of the virtual object is T3' even though the object should be positioned at T3.

In addition to reducing the error rate, synthetic three-dimensional motion vectors may reduce the effect of reprojection error. The reprojection error caused by using two-dimensional motion vectors causes the position of the virtual object to be offset from what the position of the virtual object position should be. In some embodiments, such as when motion occurs across more than three intervals (e.g., time T1-time 3), the reprojection error may be propagated such that at further intervals, the virtual object may be further offset from what the position of the virtual object should be. Using synthetic three-dimensional motion vectors may reduce the variance between the incorrect position and what the position should be. Further, the reduced variance may reduce the propagation of the reprojection error across subsequent time intervals, thereby improving the visual appearance of the motion of the virtual object to the user.

In some embodiments, visual coherence can be further improved by using three-dimensional motion vectors. For instance, the application executed by the AR device to generate the virtual objects may output three-dimensional motion vectors instead of two-dimensional motion vectors. Using three-dimensional motion vectors, the motion of the virtual object may be tracked entirely within the three-dimensional coordinate space and after the final position (at the subsequent time interval) of the three-dimensional coordinates are determined, the pixels of the virtual object will be projected onto the two-dimensional image plane. As illustrated in FIG. 5, T1 is the ball position at time 1, T2 is the ball position at time 2, T3 is the ball position at time 3, T1' is the estimated ball position at time 1 using 2D motion vectors plus depth information, and T3' is the extrapolated ball position at time 3 using 2D motion vectors. A represents the 3D motion vector from T1 to T2, B represents the 3D motion vector from T2 to T3, and a represents the 2D motion vector from T1 to T2.

For instance, as illustrated in FIG. 5, the virtual object may be at position T1 at time 1 and, subject to motion vector A, may appear at position T2 after time 2. The extrapolation illustrated in FIG. 5 places the virtual object at T3. The reprojection of the virtual object at T3 accurately reflects both the position of the virtual object given the relative motion and the size of the virtual object given the proximity of the virtual object relative to the user.

The inventors have determined that building 3D motion vectors from 2D motion vectors plus depth is not always accurate. As illustrated in FIG. 5, 2D motion vector "a" plus depth information is used to estimate T1', where T1' is an approximation of T1 and B' is not equivalent to B.

In some embodiments, synthetic three-dimensional motion vectors may use slightly more processing resources than two-dimensional motion vectors. In some embodiments, synthetic three-dimensional motion vectors may use less processing resources than true three-dimensional motion vectors.

In some embodiments, the AR device may use a combination of two-dimensional motion vectors, synthetic three-dimensional motion vectors, and three-dimensional motion vectors. For example, the AR device may use two-dimensional motion vectors to reduce the processing burden in the reprojection (e.g., fewer data points to process translates to faster processing and reduced resource consumption), synthetic three-dimensional motion vectors for reduced processing burden, but with reduced error rate and increased accuracy, and/or three-dimensional motion vectors to eliminate reprojection errors and further increase the accuracy of the reprojection. The AR device may automatically switch between two-dimensional motion vectors, synthetic three-dimensional motion vectors, and three-dimensional motion vectors based on current processing conditions (e.g., conserving resources when resources are scarce and increasing accuracy when resources are available), user selection, remote command (e.g., from a server or the like), upon detection of a reprojection error rate exceeding a threshold, upon detection of a magnitude of a reprojection error exceeding an error threshold, combinations thereof, or the like.

Figure 6:
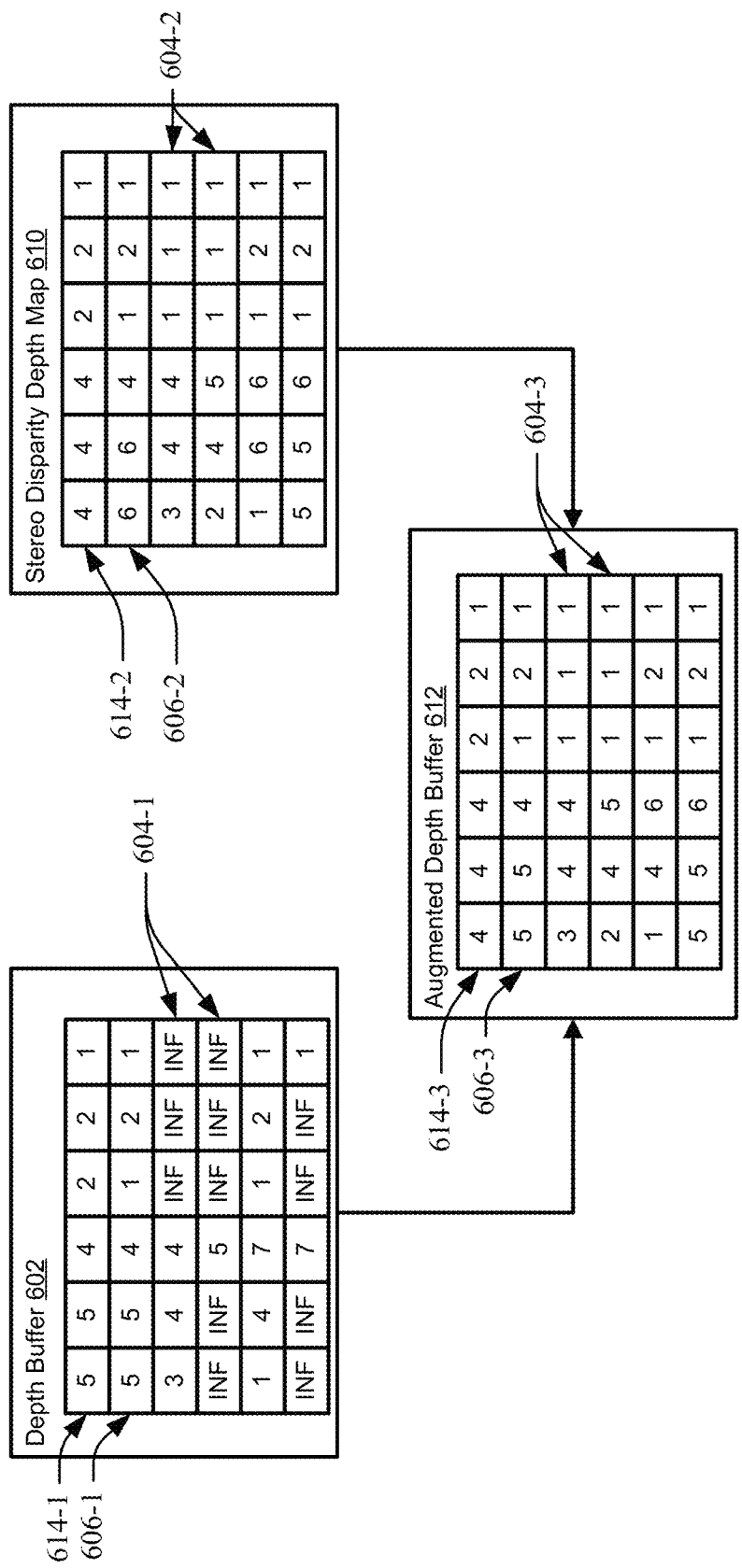
FIG. 6 illustrates a block diagram of an augmented depth buffer according to at least one aspect of the disclosure.

FIG. 6 illustrates a block diagram of an augmented depth buffer, according to some embodiments. Reprojection of virtual content with an AR device may use depth information to accurately present virtual content relative to real-world objects and relative to other virtual content. An application projecting virtual content may store depth values for the virtual content in depth buffer 602. Depth buffer 602 may store the depth values for each pixel. For instance, depth buffer 602 may include depth values for each pixel of a display resolution of a display of the AR device (e.g., 2560×1920, 1280×960, 640×480, 320×240, etc.). In some embodiments, depth buffer 602 may have a resolution that is larger than the number of pixels of the display (e.g., with the excess pixels being used for downsampling). In some embodiments, depth buffer 602 may have a resolution that is smaller than the number of pixels of the display (e.g., in which upsampling may be used to derive a depth value for each pixel).

Depth buffer 602 is an example of a depth buffer that stores depth values in a 6×6 array although this particular array size is merely exemplary and the present disclosure is not limited to this particular array size. Each cell of the array may be addressed in a row/column pair with the top left most cell being 1,1 (e.g., row 1, column 1). Each cell of the array represents a depth value of a particular pixel (or a set of pixels if upsampled). Depth buffer 602 may include, for each pixel, either a depth value or a value representing a large or infinite depth, referenced herein as INF, for example, where no depth value is provided by the application. The INF value may be a large number such as a far end of the clip range specified by a projection model or the maximum depth of the three-coordinate space. Values other than INF may be used to indicate the pixel has no depth information. In some embodiments, the application may not provide a depth value for some pixels that correspond to certain types of surfaces, such as translucent surfaces (e.g., glass), particles such as smoke or other particulates, and the like, where there is no virtual content at the particular pixel location, or the data may be otherwise incomplete. Thus, depth buffer 602 at these pixel locations may be set to INF, or some other value (including a null value) to indicate that there is no depth value at that pixel location. For instance, depth buffer 602 includes a few INF cells such as cells 604-1 that correspond to depth values that were unavailable, infinite, undefined, etc. Other cells, including cells 614-1 and 606-1 include depth values, for example, 5 m for cell 614-1 and 5 m for cell 606-1. In some embodiments, when a depth value is unknown, depth buffer 602 may store, rather than INF, a null value, no value, or a predetermined value that indicates the depth value for that pixel is unknown, unavailable, undefined, etc.

A stereo disparity depth map 610 may be generated by analyzing the disparity between two versions of a same frame. For instance, a first version of a frame presented to a first eye of the user and a second version of the frame presented to a second eye of the user may be analyzed to determine the depth of the virtual content presented by the frames (e.g., similar depth perception). In some embodiments, the frame may include two-dimensional content. Stereo disparity may generate depth values for each pixel of the environment (e.g., including translucent surface, particles, etc.). In some instances, depth buffer 602 may include unknown depth values for depths that exceed a certain threshold distance as the derived depth values may be too inaccurate or unobtainable. As a result, stereo disparity depth map 610 can have a resolution that is up to the display resolution of the display and addressed according to the same schema (row/column pairs). During generation of augmented depth buffer 612 (described below), stereo disparity depth map 610 may be processed (e.g., upsampling/downsampling) to equal the resolution of depth buffer 602 (if not already the same resolution). In some embodiments, depth buffer 602 may be processed (e.g., upsampling/downsampling) to equal the resolution of stereo disparity depth map 610. In some embodiments, both stereo disparity depth map 610 and depth buffer 602 may be processed (e.g., upsampling/downsampling) to a target resolution (e.g., a resolution of augmented depth buffer 612).

The stereo disparity process may consume significant processing resources if a depth value is derived for each pixel. In some embodiments, processing resources may be preserved by deriving the depth of sets of pixels (e.g., 2×2, 4×4, etc.), then upsampling the set of pixels to derive a particular depth value for each pixel. This may sacrifice some accuracy in the depth value to achieve a reduction in processing resources. Thus, the AR device may modify resolution of stereo disparity depth map 610 at runtime based on the current processing resources available. For instance, if processing resources are low, depth values may be derived for every 4×4 set of pixels (or some other lower resolution). Later, if more processing resources are available, the AR device may derive depth values at a higher resolution (e.g., every 2×2 set of pixels, or every pixel).

As noted above, stereo disparity depth map 610 can derive depth values for each pixel of the virtual content including those pixels that correspond to translucent surfaces or the like. For instance, stereo disparity depth map 610 includes values for cells 604-2 for which depth buffer 602 includes null values (e.g., INF), 604-2 points to cells 3,6 and 4,6 of the stereo disparity depth map 610 and 604-1 points to the corresponding cells 3,6 and 4,6 of depth buffer 602.

Depth values derived from stereo disparity may not always be accurate. For instance, depth values for monocular portions of each frame (e.g., the far left portion of the frame presented to the left eye and the far right portion of the frame presented to the right eye) may not be included or may be guessed due to the lack of true stereo disparity. In addition, the derived depth values for some surfaces (e.g., texture-less, or repetitive patterns) may be inaccurate. In some instances, the derivation of depth values at a lower resolution (e.g., a 4×4 set of pixels or a 6×6 set of pixels) may reduce the accuracy of the resulting depth values per pixel beyond a reasonable tolerance such that subsequent reprojection errors may occur. In those instances, the resolution for deriving depth values from stereo disparity may be increased until the accuracy exceeds a reasonable tolerance.

The AR device may generate augmented depth buffer 612 that combines values from depth buffer 602 and stereo disparity depth map 610. Augmented depth buffer 612 may select values such that the augmented depth value includes values for each pixel (compared to depth buffer 602, which may have INF values) with a high degree of accuracy (compared to stereo disparity depth map 610). In some embodiments, augmented depth buffer 612 may have a resolution that is equal to the resolution of the display resolution of the AR device (e.g., a depth value for each pixel of the AR device). In some embodiments, augmented depth buffer 612 may have a resolution that is larger or smaller than the resolution of the display resolution of the AR device (e.g., depth values for each pixel of the AR device may be determined by upsampling or downsampling). Each cell of augmented depth buffer 612 may be addressed according to the schema described above in connection with depth buffer 602 (e.g., row/column pairs). For each pixel of augmented depth buffer 612, augmented depth buffer 612 may store the value of the corresponding cell from stereo disparity depth map 610. Then each pixel of augmented depth buffer 612 may be updated based on the value stored in depth buffer 602. In signed/unsigned projection models, the smaller depth value is stored in augmented depth buffer 612. For instance, if the depth value stored in depth buffer 602 is smaller (e.g., closer to the AR device) than the current depth value stored in augmented depth buffer 612, it is replaced with the depth value of depth buffer 602. Otherwise, if the depth value stored in depth buffer 602 is larger than the depth value currently stored in augmented depth buffer 612, then the value in augmented depth buffer 612 may not be updated. In reverse projection models, the larger depth value may be selected.

In some instances, the AR device may process depth buffer 602 and stereo disparity depth map 610 to a target resolution. Then, for each pixel, the AR device may compare each pair of corresponding depth values (of the pixel) and select the smaller value (e.g., using a MIN function or the like). Since unknown depth values are given INF values, any known depth value (in either depth buffer 602 or stereo disparity depth map 610) will be smaller and be stored as the depth value for the pixel in augmented depth buffer 612 during the MIN operation. Thus, by performing a MIN operation on depth buffer 602 and stereo disparity depth map 610, augmented depth buffer 612 can be created as a result of the MIN operation.

For instance, stereo disparity depth map 610 includes depth values for cells 604-2 for which there is no value stored in the corresponding cells 604-1 of depth buffer 602. The values from cells 604-2 may be stored in the corresponding cells 604-3 of augmented depth buffer 612 as depicted. Stereo disparity depth map 610 includes depth values for cells 614-2 and depth buffer 602 includes depth values for cells 614-1. The conflicting depth values can be resolved by determining which cell 614-1 or 614-2 has the smaller depth value. Since cell 614-2 stores the smaller depth value, this depth value will be stored in the corresponding cell 614-3 of augmented depth buffer 612. Similarly, a conflict exists between cells 606-1 and 606-2. Since the cell 606-1 stores the smaller depth value, this depth value will be stored in the corresponding cell 606-3 of augmented depth buffer 612. The process may continue until each cell of augmented depth buffer 612 is populated with a depth value and the depth value is then the smaller depth value between depth buffer 602 and stereo disparity depth map 610 (if there is a depth value in each structure) as depicted by augmented depth buffer 612.

Figure 7:
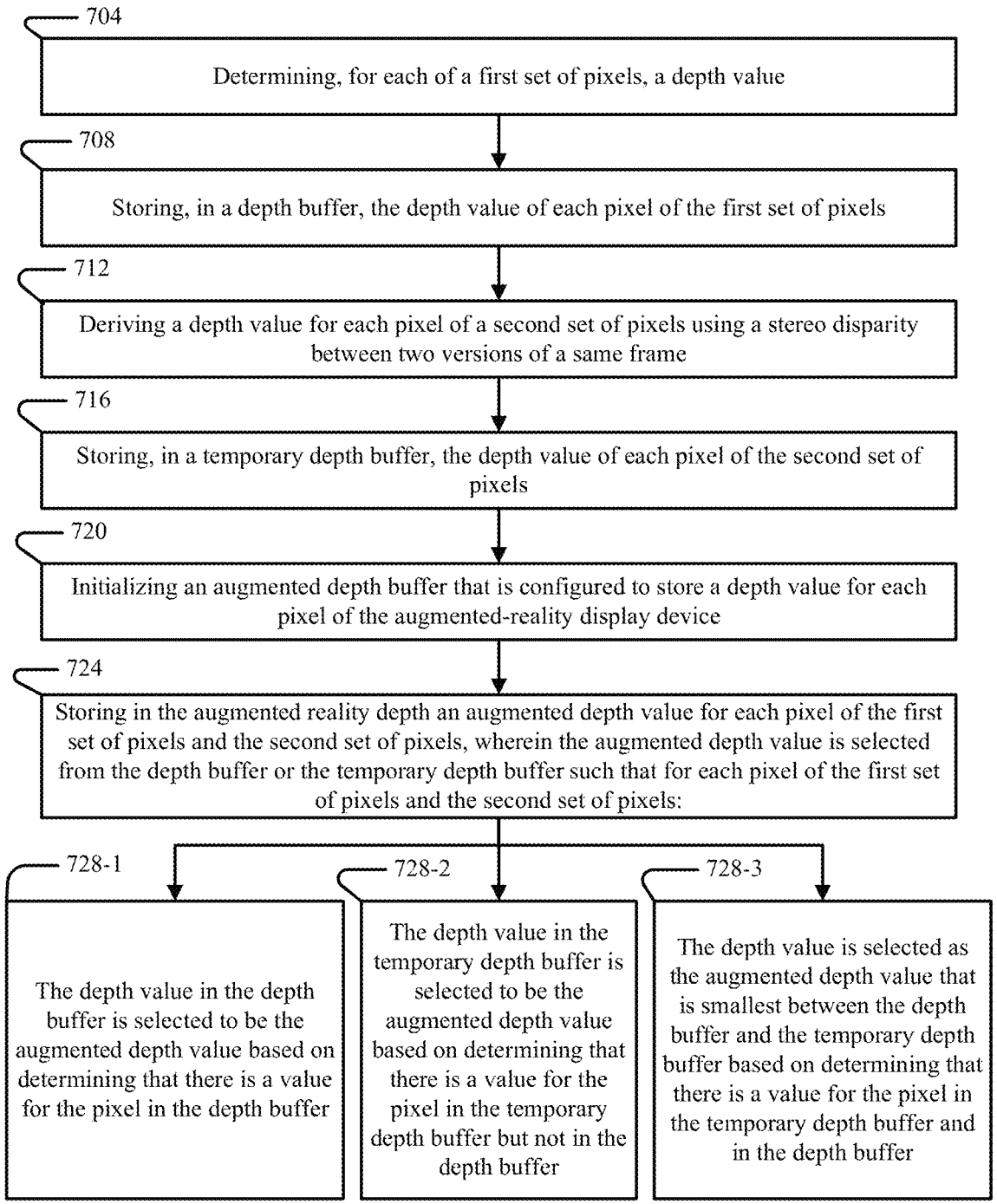
FIG. 7 is a flowchart illustrating a method for generating an augmented depth buffer according to at least one aspect of the disclosure.

FIG. 7 is a flowchart illustrating a method for generating an augmented depth buffer according to some embodiments.

At block 704, a depth value for each of a first set of pixels may be provided by the application that is generating the virtual content. For instance, the AR device may receive depth values for each pixel of a first set of pixels from an application executing on the AR device (and providing the virtual content). The first set of pixels may be a subset of the total number of pixels associated with the virtual content such that a depth value will be associated with some or all of the pixels associated with the virtual content. As described above, if a depth value is not provided by the application, an INF value may be used to represent the depth value of a pixel. Since there are more three-dimensional pixels than there are two-dimensional coordinates of the display, each two-dimensional coordinate of the display may correspond to one or more pixels of the three-dimensional coordinates. The AR device may resolve the conflict by selecting characteristics of the closest pixel (e.g., smallest depth) from the one or more pixels of the three-dimensional coordinates. By selecting the closest pixels, the closer objects will be presented as if overlapping and occluding distant objects.

The first set of pixels may be equal to the display resolution of the AR device (e.g., the total number of pixels), may be equal to a portion of the display resolution of the AR device (e.g., only those pixels associated with virtual content or only those pixels for which depth values are known), or may be greater than the display resolution of the AR device.

At block 708, the depth values of each pixel of the first set of pixels may be stored in a depth buffer (e.g., depth buffer 602). The depth buffer may be a data structure that corresponds to an allocated region of memory. For instance, the depth buffer may be an M by N array or the like. The memory locations within the depth buffer may be addressable using a characteristic of the pixel that corresponds to the depth value to avoid advance identification of depth value locations. In some embodiments, the depth buffer may be operated by an application of the AR device such as the application providing the virtual objects. In some embodiments, the depth buffer may be operated by low level system (e.g., in a layer below the application). The depth buffer may be configured to store a depth value for each pixel. If the first set of pixels is smaller than the total number of pixels of the display, then storing the depth values from block 704 may only fill a portion of the depth buffer. The depth buffer may provide a null value or an INF value for the depth values for the pixels for which there is no depth information known.

In some embodiments, the application may generate the depth buffer and pass the depth buffer (or a reference thereto) to the AR device. In those embodiments, blocks 704-708 may instead be receiving, from the application of the AR device, a depth buffer that includes depth values for each of a first set of pixels.

At block 712, depth values are derived for each pixel of a second set of pixels using stereo disparity. Stereo disparity may include an analysis of two versions of a same frame (e.g., a first version of a frame presented to one eye of the user and a second version of the frame presented to the other eye of the user). The analysis may identify parallax between the two versions of the frame so as to determine an approximate distance between the AR device and surfaces depicted by the images. In some embodiments, the depth values may be derived for sets of pixels at a time (e.g., which may reduce the resolution of the derived values). For instance, the depth information may be derived for each 4×4 set of pixels. This may reduce processing overhead and increase the rate at which depth information is derived. In some embodiments, the depth values may be derived for each pixel.

The second set of pixels may be equal to the total number of pixels of the device or some subset thereof. In some embodiments, the first set of pixels may be a subset of the second set of pixels. For instance, each pixel of the first set of pixels may be in the second set of pixels (but not vice versa). In some embodiments, the first set of pixels may be equal to the second set of pixels. In some embodiments, the first set of pixels and second set of pixels may overlap in which some pixels of the first set of pixels may be in the second set of pixels as well and the first set of pixels and/or the second set of pixels may include pixels that are not within the other set.

The stereo disparity analysis may reveal depth information for each pixel of the second set of pixels, which may include depth values for pixels that lack depth information from the application.

At block 716, the depth values derived from the stereo disparity are stored within a temporary depth buffer (e.g., stereo disparity depth map 610).

At block 720, an augmented depth buffer (e.g., augmented depth buffer 612) may be initialized. The augmented depth buffer may be configured to store depth values for each pixel (e.g., the pixels represented by the three-dimensional representation of the virtual content). This can include a depth value for each unique pixel from the first set of pixels and the second set of pixels. The augmented depth buffer may be initialized such that each pixel has an initial value of INF (e.g., any number that is larger than a maximum depth value for the AR device).

At block 724, the depth information from the depth buffer and the temporary depth buffer may be merged into the augmented depth buffer to provide a depth value, in the augmented depth buffer, for each unique pixel of the first set of pixels and the second set of pixels. For each unique pixel of the first set of pixels and the second set of pixels, the depth value is selected from one of the depth buffer or the temporary depth buffer according to 728-1, 728-2, or 728-3 (described below).

At block 728-1, the AR device may determine that there is a depth value for the pixel in the depth buffer and, if so, the depth value from the depth buffer is stored in the augmented depth buffer. In some embodiments, such as when the second set of pixels is equal to the total pixels for the AR device, block 728-1 may be omitted due to the depth value of the depth buffer being overwritten by block 728-2 or 728-3.

At block 728-2, the AR device may determine that there is a depth value for the pixel in the temporary depth buffer and not in the depth buffer and, if so, the depth value from the temporary depth buffer is stored in the augmented depth buffer.

At block 728-3, the AR device may determine that there is a depth value for the pixel in the depth buffer and the temporary depth buffer (i.e., a conflict exists between the respective depth values). If there is a depth value for the pixel in both the depth buffer and the temporary depth buffer, then the smaller depth value is selected to be stored in the augmented depth buffer for the pixel. For instance, if the depth value stored in the depth buffer is three meters and the depth value stored in the temporary depth buffer is four meters, then the depth value stored in the depth buffer is stored in the augmented depth buffer as it is the smaller depth value.

In some embodiments, unknown values (either buffer) may be assigned an INF value. In these embodiments, 728-1 and 728-2 may be omitted from the process. For instance, since each pixel has a corresponding depth value in each buffer, block 728-3 will ensure, if a first depth value in one buffer is compared to INF (e.g., an unknown depth value), the first depth value will always be smaller and thus always be selected for the augmented depth buffer. In those embodiments, each corresponding pair of depth values for a pixel may be compared and a MIN function (or the like) may be used to select the smaller value from the pair of values.

In some embodiments, rather than merging the depth buffer and the temporary depth buffer, the values of one of the depth buffer or the temporary depth buffer may be stored in the augmented depth buffer. The augmented depth buffer may then be updated using the other buffer. For instance, the values from the stereo disparity analysis (e.g., the temporary depth buffer) may be stored in the augmented depth buffer. Those values may then be updated using the depth values of the depth buffer. In some embodiments, the depth buffer is augmented by updating the values of the depth buffer with the values of the temporary depth buffer as appropriate (e.g., such that a separate augmented depth buffer need not be generated).

It should be appreciated that the specific steps illustrated in FIG. 7 provide a particular method for generating an augmented depth buffer. Other sequences of steps may also be performed. For example, the steps outlined above may be performed in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
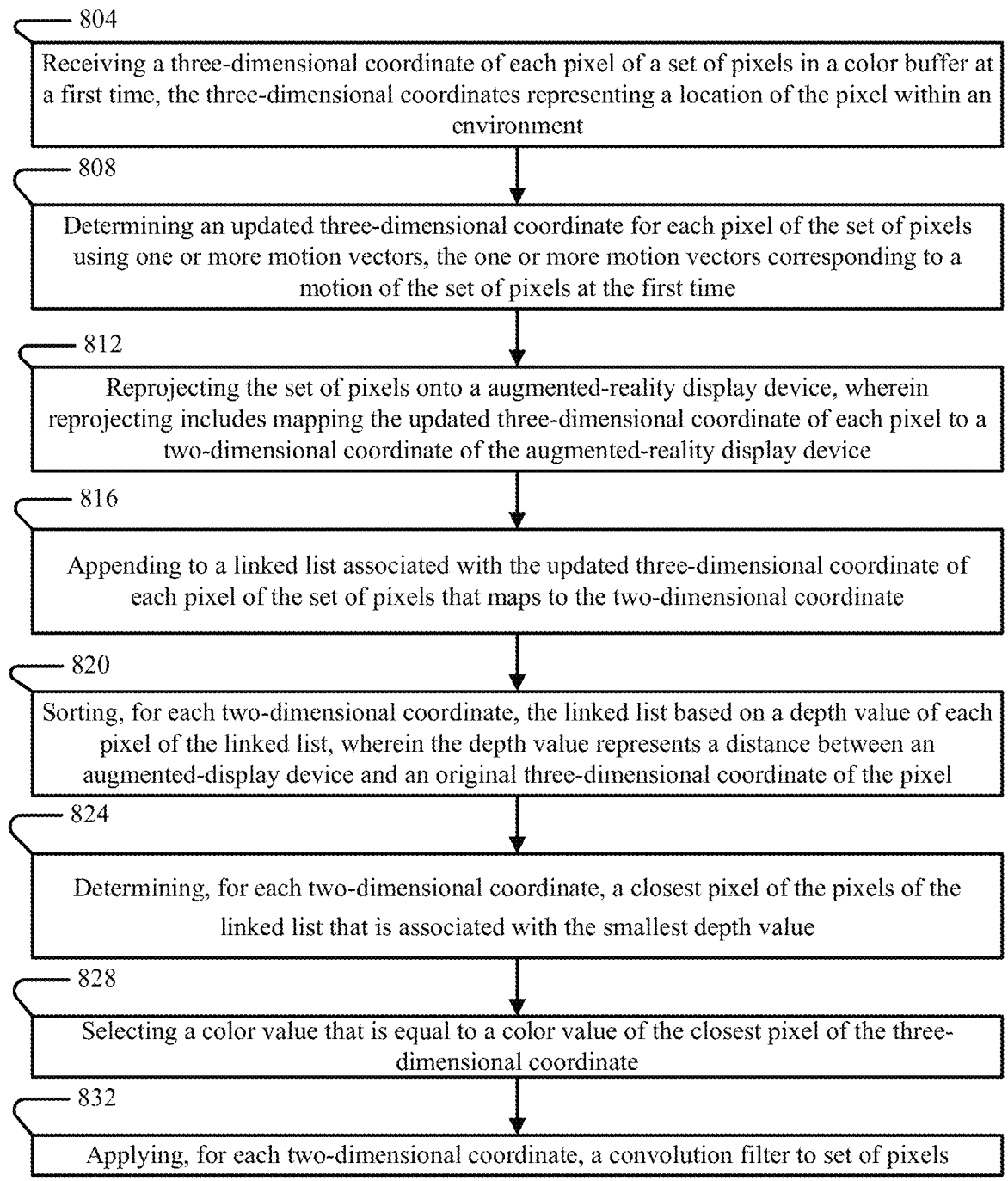
FIG. 8 is a flowchart illustrating a method for implementing positional warp using motion vectors according to at least one aspect of the disclosure.

FIG. 8 is a flowchart illustrating a method for implementing positional warp using motion vectors, according to some embodiments. Positional warp may ensure that reprojected virtual objects appear appropriately given the change in position relative to the AR device. For instance, if a virtual object moves closer, it may appear larger. If the perspective of the AR device changes relative to the virtual object, the appearance may be matched to the change in perspective (e.g., if the AR device is closer to the bottom corner of the virtual object with the furthest corner being at a larger depth from the AR device, the virtual object may appear stretched such that the bottom corner is larger than the corner that is furthest from the AR device to maintain the coherence of the virtual object given the perspective of the AR device). If the virtual object moves such that a portion of the virtual object overlaps with a second virtual object, then positional warp reprojects the virtual object at the correct location and occludes a portion of the second virtual object (to maintain the proper depth of field appearance of the virtual object in front of the second virtual object). Positional warp may also ensure that real-world objects that are closer than the virtual object occlude the correct portion of the virtual object.

The positional warp process may use multiple passes in which each pixel of a three dimensional coordinate space may be processed to reproject a virtual object. For instance, blocks 804-816 may represent a first pass through the coordinate space. Blocks 820-828 may represent a second pass through the coordinate space. Block 832 may represent a third pass through the coordinate space. In some embodiments, the implementation of positional warp using motion vectors as described in relation to FIG. 8 may be performed entirely within a single pass of the coordinate space.

At block 804, the AR device may determine the three-dimensional coordinates of each pixel of a set of pixels in a color buffer at a first time T1. The AR device may derive the three-dimensional coordinates using the pixel location available via the color buffer (e.g., the two dimensional coordinates), a corresponding depth value for the pixel available via the augmented depth buffer, and the position of a virtual camera at a time T0 when the color buffer was generated. In some embodiments, the application executing on the AR device may pass the three-dimensional coordinates of the set of pixels. The three-dimensional coordinates represent a location of the pixel within an environment. The time T1 may be some time after a first frame was rendered by the AR device (e.g., a time interval from time T0 to time T1). The time difference between time T0 and time T1 may be the time interval between when the first frame was displayed to the user at time T0 and when the next frame is being rendered at time T1. The time difference may be predetermined (e.g., to preserve a particular frame rate of the AR device) such as 5 ms, 10 ms, 15 ms, or any other time selected by a developer or otherwise selected by the AR device.

At block 808, the AR device determines an updated three-dimensional coordinate for each pixel of the set of pixels using a corresponding set of motion vectors. The set of motion vectors may be two-dimensional motion vectors, synthetic three-dimensional motion vectors (as described above), or true three-dimensional motion vectors. In some embodiments, each motion vector of the set of motion vectors may correspond to the motion of a pixel. In some embodiments, each motion vector may correspond to a quantity of pixels, a surface, or the like. The AR device may determine the three-dimensional coordinates by multiplying the motion vector by a time interval to determine a distance (in the three-dimensional coordinate space) that the pixel traveled and subsequently the updated three-dimensional coordinates for the pixel. The time interval is the interval between a first time, time T1, and a second time, time T2 (e.g., when a previous frame was displayed and a next frame is generated).

At block 812, the AR device reprojects the set of pixels onto a two-dimensional display of the AR device. Since the set of pixels is associated with a three-dimensional coordinate space, the reprojection includes mapping the updated three-dimensional coordinate of each pixel to the two-dimensional coordinate of the two-dimensional display. Representing pixels in three-dimensions enables a much larger resolution (e.g., more pixels), which may be larger than the two-dimensional display. Multiple three-dimensional coordinates may be mapped to the same two-dimensional coordinate. The AR device may continue to track these pixels using a linked-list data structure for each two-dimensional coordinate of the display. For instance, the linked-list may store the pixel, a reference to a pixel (e.g., a pointer), an identification of the pixel (e.g., an identifier such as a hash), characteristics of the pixel (e.g., color data and/or depth data), combinations thereof, or the like.

At block 816, the AR device may, for each two-dimensional coordinate, append the linked-list data structure associated with the two-dimensional coordinate with every pixel that has an updated three-dimensional coordinate that maps to the two-dimensional coordinate. The AR device may iteratively append the linked list each time it identifies a pixel that has an updated three-dimensional coordinate that maps to the two-dimensional coordinate until there are no more three-dimensional coordinates to map. In some instances, the AR device may identify each pixel that has an updated three-dimensional coordinate that maps to the two-dimensional coordinate and generate the linked-list using these pixels. Though a particular data structure is described (e.g., the linked-list), any such data structure may be used such as an array, an object, a stack/queue, or the like.

At block 820, the AR device, for each two-dimensional coordinate, sorts the linked list associated with the two-dimensional coordinate based on a depth value associated with each pixel stored (or referenced) by the linked-list. The depth may represent a distance between the updated three-dimensional coordinate and the AR device. In another embodiment, the depth may represent a distance between an augmented-display device and an original three-dimensional coordinate of the pixel. The linked-list may be sorted such that the pixel with the smallest depth appears first or last in the linked list.

At block 824, the AR device determines, for each two-dimensional coordinate, the pixel in the linked list that is closer than other pixels of the linked list. For instance, since the linked-list is sorted based on depth, this may be the first or last pixel of the linked-list (depending the sorting scheme).

At block 828, the AR device selects the pixel having the smallest depth as the pixel to be displayed at the two-dimensional coordinate using color information associated with the pixel. For instance, since multiple three-dimensional coordinates may map to the same two-dimensional coordinate of the display, the AR device can select which pixel (associated with the three-dimensional coordinate) is to be displayed via the two-dimensional coordinate. The closest pixel may be selected as the pixel that is in front of those pixels having a larger depth. Thus, the closest pixel when displayed should occlude those more distant pixels. Selecting the closest pixel ensures that the resulting reprojection maintains the representation of virtual objects among the depth of field with the closer virtual objects being positioned in front of and potentially occluding virtual objects (or real-world objects) positioned further away.

At block 832, the AR device may apply a convolution filter to the two-dimensional coordinates of the display to fill in the gaps introduced from disocclusion (e.g., where occluded objects or portions thereof become visible), changes in pixel density, or the like. The convolution filter may use a convolution kernel to modify each pixel based on characteristics (e.g., depth, color, etc.) of neighboring pixels. Once the filter is applied to the two-dimensional coordinates (e.g., each two-dimensional coordinate or the two-dimensional coordinates that correspond to virtual content to be rendered), the filtered two-dimensional coordinates may be displayed by the display of the AR device (e.g., as a second frame at time T2) and the process may repeat at subsequent time intervals (e.g., times T3, T4, etc.). The process illustrated in FIG. 8 may be repeated any number of times within the set time intervals until there is no more content to render or the device is powered off. In some embodiments, the process may be repeated outside the set time intervals (e.g., such that the reprojection occurs more or less frequently).

It should be appreciated that the specific steps illustrated in FIG. 8 provide a particular method for implementing positional warp using motion vectors. Other sequences of steps may also be performed. For example, the steps outlined above may be performed in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
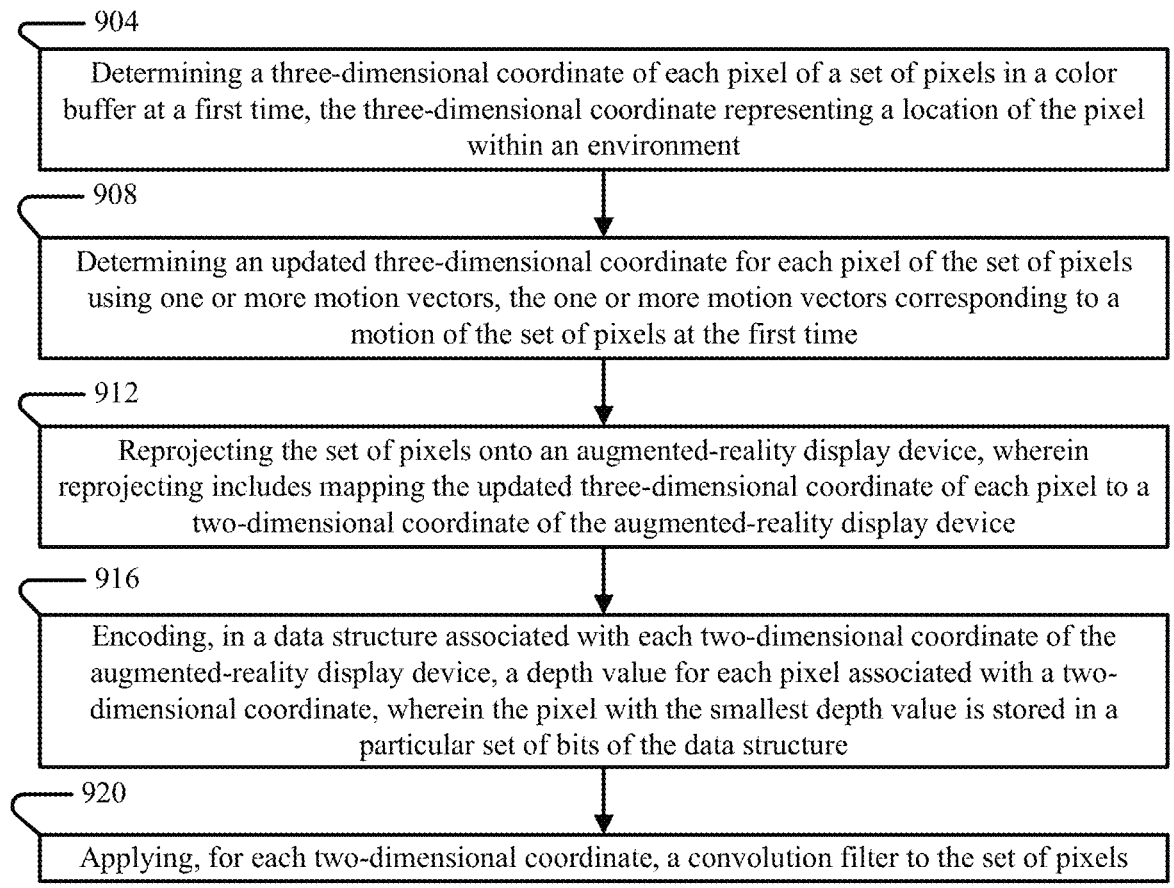
FIG. 9 is a flowchart illustrating a method for implementing a specific embodiment of positional warp using motion vectors according to at least one aspect of the disclosure.

FIG. 9 is a flowchart illustrating a method for implementing a positional warp using motion vectors, which may be referred to as a modified positional warp process, according to some embodiments. The modified positional warp process may provide positional warp using a reduced number passes through the coordinate space than the process discussed in relation to FIG. 8 above. For instance, blocks 904-916 may represent a first pass through the coordinate space. Block 920 may represent a second and final pass through the coordinate space. In some embodiments, the modified positional warp process discussed in relation to FIG. 9 may be performed within a single pass of the coordinate space.

At block 904, the AR device may determine the three-dimensional coordinates of each pixel of a set of pixels in a color buffer at a first time T1. The AR may determine the three-dimensional coordinates using the pixel in the color buffer and a corresponding depth value for the pixel. In some embodiments, the application executing on the AR device may pass the three-dimensional coordinates of the set of pixels to the AR device. The three-dimensional coordinates represent a location of the pixel within an environment. Time 1 may be some time after a first frame was rendered by the AR device (e.g., time T0). The time difference between time T0 and time T1 may be the timer interval between when the first frame was displayed to the user at time T0 and when the next frame is being rendered at time T1. The time difference may be predetermined (e.g., to preserve a particular frame rate of the AR device) such as 5 ms, 10 ms, 15 ms, or any other time selected by a developer or otherwise selected by the AR device.

At block 908, the AR device determines an updated three-dimensional coordinate for each pixel of the set of pixels using a corresponding set of motion vectors. The set of motion vectors may be two-dimensional motion vectors, synthetic three-dimensional motion vectors (as described above), or true three-dimensional motion vectors. In some embodiments, each motion vector of the set of motion vectors may correspond to the motion of a pixel. In some embodiments, each motion vector may correspond to a quantity of pixels, a surface, or the like.

At block 912, the AR device reprojects the set of pixels onto a two-dimensional display of the AR device. Since the set of pixels is associated with a three-dimensional coordinate space, the reprojection includes mapping the updated three-dimensional coordinate of each pixel to the two-dimensional coordinate of the two-dimensional display. Representing pixels in three-dimensions enables a much larger resolution (e.g., more pixels), which may be larger than the two-dimensional display. Multiple three-dimensional coordinates may be mapped to the same two-dimensional coordinate. The AR device may track these pixels using a particular data structure (e.g., structured) or using a region of memory (e.g., unstructured) for each two-dimensional coordinate of the display.

At block 916, the AR device may, for each two-dimensional coordinate, encode each pixel with an updated three-dimensional coordinate that maps to the two-dimensional coordinate within a data structure associated with the two-dimensional coordinate. The data structure may store the pixel, a reference to a pixel (e.g., a pointer), an identification of the pixel (e.g., an identifier such as a hash), characteristics of the pixel (e.g., color data and/or depth data), combinations thereof, or the like. In some embodiments, each pixel may be encoded within particular bits of the data structure. For instance, the data structure may include N bits. The pixel with the smallest depth value with respect to other pixels of the data structure may be stored in the upper N/2 bits of the data structure. Encoding the pixel with the smallest depth within a particular memory location of the data structure enables the AR device to identify the correct pixel from the three-dimensional coordinate space to display within the two-dimensional display of the AR device without another pass through the coordinate space. In other words, encoding the closest pixel (with the smallest depth value) reduces the number of passes that may be performed.

At block 920, the AR device may apply a convolution filter to the two-dimensional coordinates of the display to fill in the gaps introduced from disocclusion (e.g., where occluded objects or portions thereof become visible), changes in pixel density, or the like. The convolution filter may use a convolution kernel to modify each pixel based on characteristics (e.g., depth, color, etc.) of neighboring pixels.

Once the filter is applied to the two-dimensional coordinates (e.g., each two-dimensional coordinate or the two-dimensional coordinates that correspond to virtual content to be rendered), the filtered two-dimensional coordinates may be displayed by the display of the AR device (e.g., as a second frame at time T2) and the process may repeat at subsequent time intervals (e.g., times T3, T4, etc.). The process illustrated in FIG. 9 may be repeated any number of times within the set time intervals until there is no more content to render or the device is powered off. In some embodiments, the process may be repeated outside the set time intervals (e.g., such that the reprojection occurs more or less frequently).

It should be appreciated that the specific steps illustrated in FIG. 9 provide a particular method for implementing a specific embodiment of modified positional warp process using motion vectors. Other sequences of steps may also be performed. For example, the steps outlined above may be performed in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
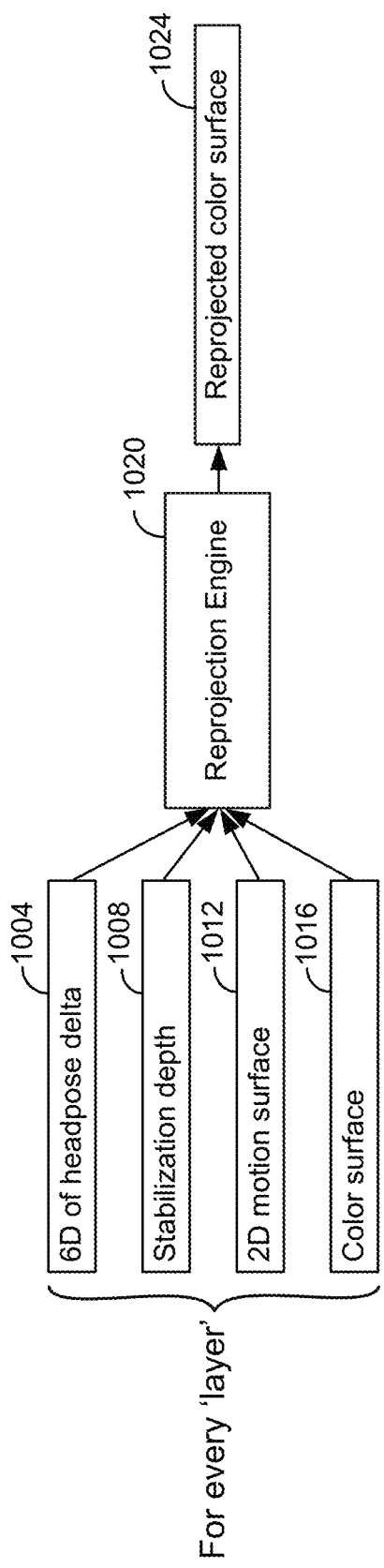
FIG. 10 illustrates a block diagram of a three degrees-of-freedom reprojection engine according to at least one aspect of the disclosure.

FIG. 10 illustrates a block diagram of an upgraded three degrees of freedom (DoF) reprojection engine, according to some embodiments. The three DoF reprojection engine generates a reprojection of a virtual object from characteristics of the pixels that make up the virtual object. For instance, the reprojection engine may use a first frame at a first time (time T0) and a set of transformations (e.g., changes in a headpose, motion of pixels) to extrapolate from the first frame to a new location for the virtual content at a subsequent time (time T1). The AR device may present virtual content at time T0 that may move in a particular direction with respect to the coordinate space of the real-world environment. The AR device extrapolates from the first frame and the motion, for example, to provide an updated location of the virtual content within the coordinate space.

Reprojection engine 1020 may receive, as input, six DoF headpose difference (delta) 1004, stabilization depth 1008, two-dimensional motion surface 1012, and color surface 1016. Reprojection engine 1020 may output a reprojected color surface 1024 for a particular layer of virtual content. Reprojection engine 1020 may execute multiple times to provide multiple layers for the reprojected color surface for color blending or the like.

Six DoF headpose difference 1004 may be received as an input for reprojection engine 1020. Six DoF headpose difference 1004 can be the difference in the headpose of the AR device between a first time (e.g., the presentation of a first frame) and a second time (e.g., when a subsequent frame is to be rendered). The six DoF headpose captures a position (e.g., in three-dimensional space) and an orientation (e.g., rotation such as yaw, pitch, and roll) of the AR device. In order to determine an updated location for a reprojected virtual content, perspective of the virtual content with respect to the AR device may be determined.

Six DoF headpose difference 1004 may be used to reproject the virtual content due to motion of the AR device relative to the real-world environment. For instance, the virtual content may remain stationary, but still be reprojected due to the change in position or orientation of the AR device. The reprojection may enable the virtual content to maintain visual coherence within the real-world environment (as a fixed virtual object) despite the movement of the AR device.

Stabilization depth 1008 may be a single value that provides a depth of the virtual content. In some embodiments, the stabilization depth value may be applied to each two-dimensional coordinate to be rendered to cause the virtual content to appear with a consistent depth. In some embodiments, the stabilization depth value may be applied to certain pixels (e.g., pixels having a particular depth value or the like).

Two-dimensional motion surface 1012 may include one or more two-dimensional motion vectors that characterize the motion of a surface. For instance, each coordinate of the surface may be represented by a pixel associated with a two-dimensional motion vector. In some embodiments, groups of pixels that make up the surface may be associated with a two-dimensional motion vector. In some embodiments, the surface may be associated with a two-dimensional motion vector. The motion vector may be a two-dimensional motion vector, a synthetic three-dimensional motion vector, or a three-dimensional motion vector.

The motion vectors may be used to determine a change in position and/or orientation of the virtual content as a result of the motion. The updated position/orientation of the virtual content may be determined by multiplying the motion vector during the time interval (e.g., time T1-time T0) to provide a relative change in distance over the change in time interval. The distance can be applied to the position of the virtual content at the initial time (time T0) to determine the updated position as a result of the motion during the time interval.

Color surface 1016 provides an indication as to the color mapping of the pixels being reprojected. For instance, if the virtual object is red, the color surface provides the red color data to the reprojection engine to ensure the reprojected color surface maintains color coherence with the initial projection of the virtual content.

Reprojection engine 1020 uses six DoF headpose difference 1004, stabilization depth 1008, two-dimensional motion surface 1012, and color surface 1016 to extrapolate, from a previous frame, a new position and orientation of virtual content. Reprojection engine 1020 provides an accurate reprojection given motion of AR device relative to the real-world environment, motion by the virtual content within the real-world environment relative to the AR device, and the stabilization depth value.

In some embodiments, six DoF headpose difference 1004, stabilization depth 1008, two-dimensional motion surface 1012, and color surface 1016 may be software inputs (e.g., data or data structures). In some embodiments, six DoF headpose difference 1004, stabilization depth 1008, two-dimensional motion surface 1012, and color surface 1016 may each be databases that manage the flow of information to reprojection engine 1020. In some embodiments, reprojection engine 1020 may be a software function. In some embodiments, reprojection may be a system on a chip (SOC) that includes processing resources (e.g., processor, memory, etc.)

Figure 11:
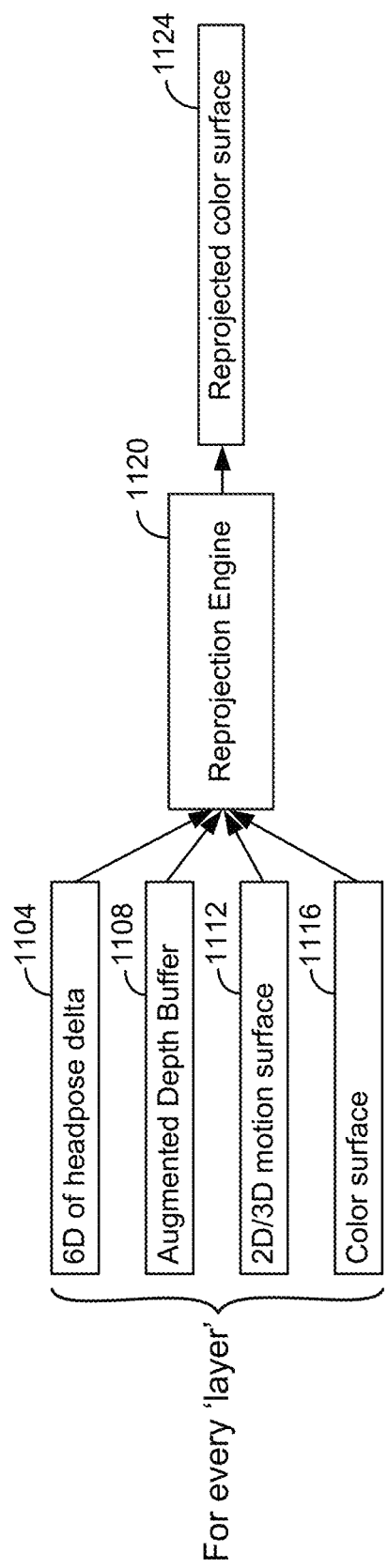
FIG. 11 illustrates a block diagram of a six degrees-of-freedom reprojection engine according to at least one aspect of the disclosure.

FIG. 11 illustrates a block diagram of a six degrees-of-freedom (DoF) reprojection engine, according to some embodiments. Six DoF reprojection engine 1120 includes additional inputs (for increased resolution of the reprojection per layer) from reprojection engine 1020. For instance, six DoF headpose difference 1104, augmented depth buffer 1108, two-dimensional/three-dimensional motion surface 1112, and color surface 1116 may be received as input. Six DoF headpose difference 1104 (described above) represents the change in position and orientation of the AR device relative to the real-world environment. Augmented depth buffer 1108 (described above) provides per pixel depth information (in a three-dimensional coordinate space). Two-dimensional/three-dimensional motion surface 1112 represents the motion of virtual content within the real-world environment relative to the AR device. The motion surface may include per pixel two-dimensional or three-dimensional motion vectors as similarly described above in connection to FIG. 10. Color surface 1116 provides color data per layer of the virtual content being reprojected to ensure that each layer (e.g., each execution of reprojection engine 1120 per layer) is a reprojection of an accurate color surface 1124.

Using per pixel depth information via augmented depth buffer 1108 and three-dimensional motion vectors, for example from two-dimensional/three-dimensional motion surface 1112, enables reprojection engine 1120 to extrapolate, from a previous frame, a new position and orientation of virtual content with reduced reprojection error and greater accuracy.

In some embodiments, six DoF headpose difference 1104, augmented depth buffer 1108, two-dimensional/three-dimensional motion surface 1112, and color surface 1116 may be software inputs (e.g., data or data structures). In some embodiments, six DoF headpose difference 1104, augmented depth buffer 1108, two-dimensional/three-dimensional motion surface 1112, and color surface 1116 may each be databases that manage the flow of information to reprojection engine 1120. In some embodiments, reprojection engine 1120 may be a software function. In other instances, reprojection may be a system on a chip (SOC) that includes processing resources (e.g., processor, memory, etc.).

Figure 12:
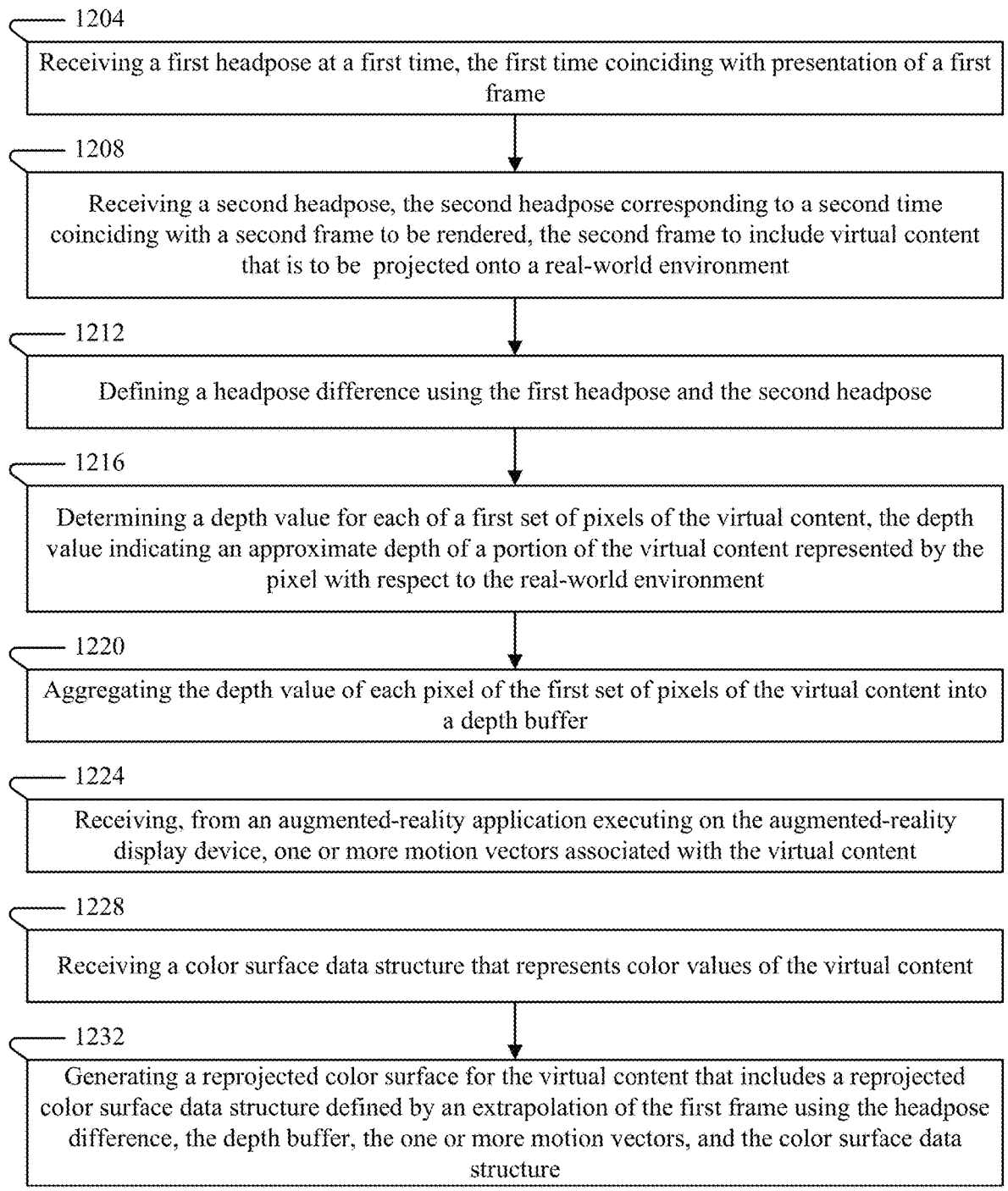
FIG. 12 is a flowchart illustrating a method of operating a reprojection engine according to at least one aspect of the disclosure.

FIG. 12 is a flowchart illustrating a method of operating a reprojection engine, according to some embodiments. At block 1204, the AR device may receive a first headpose at a time (e.g., time T1) that may coincide with the presentation of a first frame. In some embodiments, the first headpose may be received at any time between presentation of the first frame and rendering of a second frame. The headpose may be in three DoF or six DoF. The headpose may provide the position and orientation of the AR device at the first time.

At block 1208, the AR device may receive a second headpose, the second headpose corresponding to a second time (time T2) that coincides with a second frame to be rendered. The second frame can include virtual content that upon presentation to a user of the AR device will appear projected onto a real-world environment. The headpose may be in three DoF or six DoF. The headpose may provide the position and orientation of the AR device at the second time.

At block 1212, the AR device defines a headpose difference between the first headpose and the second headpose. The headpose difference (also known as the headpose delta) may be calculated by taking the difference of the first headpose from the second headpose. The headpose difference may be applied to the first headpose to derive the second headpose such that the first frame and the headpose difference may be used to define aspects of the subsequent frame to be rendered.

At block 1216, the AR device determines a depth value for each pixel of the virtual content to be reprojected (or some set of pixels that include the pixels of the virtual content). In some embodiments, this may be determined from a stabilization depth value. In some embodiments, an augmented depth buffer may be generated from a depth buffer (of the application) and a stereo disparity depth map. The augmented depth buffer may store depth values for each pixel. In some embodiments, the per pixel depth values may be received from an application of the AR device, a user, another device, etc. In some embodiments, the per pixel depth values may be loaded from a particular memory location.

At block 1220, the AR device aggregates the depth information into a depth buffer. The depth buffer may be managed by an application executing with a layer of the AR device that provides depth values associated with some or all of the pixels of the virtual content. In some embodiments, the application may not provide depth values for each pixel (e.g., such as those associated with translucent surfaces or portions of the virtual content devoid of virtual objects as discussed above). The AR device may generate an augmented depth buffer (as described above) using a combination of the depth values provided by the application and stereo disparity between two versions of the first frame (e.g., one version of the first frame presented to a first eye of the user and one version of the first frame presented to the other eye of the user). The stereo disparity may be used to fill in the depth values for pixels that lack a depth value in the depth buffer. If a depth value for a pixel exists in both the depth buffer and the stereo disparity map or buffer, the depth value that is smaller between the depth buffer and the stereo disparity may be selected as the depth value for the pixel.

At block 1224, the AR device receives motion vectors from the application. The motion vectors may be two-dimensional motion vectors, synthetic three-dimensional motion vectors (derived from two-dimensional motion vectors and depth information), or three-dimensional motion vectors. The motion vectors may represent the motion of each pixel (e.g., one motion vector per pixel), groups of pixels, or entire surfaces.

At block 1228, a color surface data structure may be received. The color surface data structure provides per layer color information associated with the virtual content to be rendered such that upon reprojection, the reprojected virtual content appears with similar or the same color profile. In some embodiments, the color surface data structure may be defined from the color surface data of the virtual content as presented in a preceding frame. In some embodiments, the color surface data structure may be an extrapolation of the color surface data of the previous frame and the characteristics of the virtual object's reprojected position (e.g., contract, lighting, surrounding colors, etc.). The characteristics of reprojected position may be used to prevent the real-world environment from affecting the appearance of the virtual content.

At block 1232, the AR device, using a reprojection engine, generates a reprojected color surface data structure for the virtual content that includes an updated color surface data structure defined by an extrapolation of the first frame using the headpose difference, the depth buffer, which may be an augmented depth buffer, the one or more motion vectors, and the color surface data structure. The reprojected color surface data structure may represent one or more layers of the reprojected color surface of the virtual content. In some embodiments, the reprojection engine executes once to generate a reprojected color surface data structure that represents a layer of reprojected color surface. The blocks 1204-1232 may execute multiple times to generate multiple reprojected color surface data structures that in turn generate multiple layers of the reprojected color surface.

In some embodiments, the processes of blocks 1204-1232 may be performed via software instructions executed by a processor or by hardware such as a system on a chip (SOC).

It should be appreciated that the specific steps illustrated in FIG. 12 provide a particular method of operating a reprojection engine. Other sequences of steps may also be performed. For example, the steps outlined above may be performed in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Any suitable computing system or group of computing systems can be used for performing the operations described herein. For example, a computing system can include a processor communicatively coupled to one or more memory devices. The processor executes computer-executable program code stored in a memory device, accesses information stored in the memory device, or both. Examples of the processor include a microprocessor, an application-specific integrated circuit ("ASIC"), a field-programmable gate array ("FPGA"), or any other suitable processing device. The processor can include any number of processing devices, including a single processing device.

The memory device includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system may also include a number of external or internal components, such as input or output devices. For example, one or more input/output ("I/O") interfaces may be included. I/O interface can receive input from input devices or provide output to output devices. One or more buses communicatively couple one or more components of a computing system.

The computing system can execute program code that configures the processor to perform one or more of the operations described herein. The program code can include a reprojection engine, code that generates augmented depth buffers, or other suitable applications that perform one or more operations described herein. The program code may be resident in the memory device or any suitable computer-readable medium and may be executed by the processor or any other suitable processor. In some embodiments, the program code can execute in a cloud environment where portions of the program code are executed by multiple devices in parallel.

The computing system may also include a network interface device. The network interface device includes any device or group of devices suitable for establishing a wired or wireless data connection to one or more data networks. Non-limiting examples of the network interface device include an Ethernet network adapter, a modem, and the like. The computing system is able to communicate with one or more other computing devices via a data network using the network interface device.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method for generating an augmented depth buffer for an augmented-reality device, the method comprising:
    initializing a depth buffer configured to store first depth values for a first set of pixels by assigning a first predetermined value to each pixel of the first set of pixels;
    initializing a stereo disparity depth buffer configured to store second depth values for a second set of pixels by assigning a second predetermined value to each pixel of the second set of pixels;
    receiving, from an augmented-reality application, an application depth value for each pixel of a third set of pixels being a subset of or equal to the first set of pixels;
    updating the depth buffer with the application depth value for each pixel of the third set of pixels;
    receiving, from a stereo disparity processor, a stereo disparity depth value for each pixel of a fourth set of pixels being a subset of or equal to the second set of pixels;
    updating the stereo disparity depth buffer with the stereo disparity depth value for each pixel of the fourth set of pixels; and
    for each pixel of the augmented depth buffer, storing, in the augmented depth buffer and at a memory location that corresponds to the each pixel, the lesser of the application depth value or the stereo disparity depth value.

2. The method of claim 1 further comprising initializing the augmented depth buffer.

3. The method of claim 1 further comprising:
    modifying a resolution of the depth buffer to match a resolution of the augmented depth buffer, wherein modifying the resolution of the depth buffer includes upsampling or downsampling; or
    modifying a resolution of the stereo disparity depth buffer to match a resolution of the augmented depth buffer, wherein modifying the resolution of the stereo disparity depth buffer includes upsampling or downsampling.

4. The method of claim 1 wherein the first predetermined value and the second predetermined value comprise a value approximating an infinite depth (INF).

5. The method of claim 1 wherein receiving the stereo disparity depth value comprises deriving, for each pixel of the second set of pixels, the stereo disparity depth value using a stereo disparity between two versions of a same frame.

6. A method for generating an augmented depth buffer for an augmented-reality device having a number of pixels, the method comprising:
    receiving, for each of a first set of pixels, a first depth value from an application executing on the augmented-reality device;
    storing, in a depth buffer, the first depth value of each pixel of the first set of pixels;
    deriving, for a second set of pixels, a second depth value using a stereo disparity between two versions of a same frame;
    storing, in a temporary depth buffer, the second depth value of each pixel of the second set of pixels;
    initializing the augmented depth buffer, wherein the augmented depth buffer is configured to store an augmented depth value for each pixel of the augmented-reality device; and
    storing, in the augmented depth buffer, the augmented depth value for each pixel of the first set of pixels and the second set of pixels, wherein the augmented depth value for each pixel of the augmented-reality device is determined by selecting, as the augmented depth value, the smaller of the first depth value or the second depth value.

7. The method of claim 6 wherein the first set of pixels is a subset of the number of pixels.

8. The method of claim 6 wherein the second set of pixels is a subset of the number of pixels.

9. The method of claim 6 wherein a number of the second set of pixels is equal to the number of pixels.

10. The method of claim 6 further comprising modifying a resolution of the depth buffer to match a target resolution, wherein modifying the resolution includes upsampling or downsampling.

11. The method of claim 6 further comprising modifying a resolution of the temporary depth buffer to match a target resolution, wherein modifying the resolution includes upsampling or downsampling.

* * * * *